(12) United States Patent
Koifman et al.

(10) Patent No.: US 10,128,932 B2
(45) Date of Patent: *Nov. 13, 2018

(54) RECEIVER, SYSTEM AND METHOD FOR FREQUENCY DIVERSITY COMMUNICATIONS USING BEACON AND METHODS USEFUL IN CONJUNCTION THEREWITH

(71) Applicant: Elta Systems Ltd., Ashdod (IL)

(72) Inventors: Gil Koifman, Petach-Tikva (IL);
Michael Elmakias, Ashdod (IL);
Yaakov Shoshan, Ashkelon (IL)

(73) Assignee: Elta Systems Ltd., Ashdod (IL)

( * ) Notice: Subject to any disclaimer, the term of this patent is extended or adjusted under 35 U.S.C. 154(b) by 175 days.

This patent is subject to a terminal disclaimer.

(21) Appl. No.: 14/891,493

(22) PCT Filed: May 20, 2014

(86) PCT No.: PCT/IL2014/050438
§ 371 (c)(1),
(2) Date: Nov. 16, 2015

(87) PCT Pub. No.: WO2014/188414
PCT Pub. Date: Nov. 27, 2014

(65) Prior Publication Data
US 2016/0119050 A1    Apr. 28, 2016

(30) Foreign Application Priority Data

May 23, 2013  (IL) ........................................... 226511
Mar. 10, 2014 (IN) .............................. 683/DEL/2014

(51) Int. Cl.
*H04B 7/12*       (2006.01)
*H04B 1/713*      (2011.01)
(Continued)

(52) U.S. Cl.
CPC .............. *H04B 7/12* (2013.01); *H04B 1/713* (2013.01); *H04B 1/74* (2013.01); *H04L 27/2646* (2013.01)

(58) Field of Classification Search
CPC ............................. H04B 7/12; H04L 27/2646
See application file for complete search history.

(56) References Cited

U.S. PATENT DOCUMENTS 2,292,386 A    8/1942  Manson
4,475,243 A   10/1984  Batlivala et al.
(Continued)

FOREIGN PATENT DOCUMENTS

WO    2007/123733 A2    11/2007
WO    2010/132476 A2    11/2010
(Continued)

OTHER PUBLICATIONS

Torvmark, K.H., "Frequency Hopping Systems," Chipcon Products from Texas Instruments, Application Note AN014, <http://www.ti.com/lit/an/swra077/swra077.pdf>, pp. 1-7 (Dec. 31, 2002).
(Continued)

*Primary Examiner* — Jeffrey M Rutkowski
*Assistant Examiner* — Voster Preval
(74) *Attorney, Agent, or Firm* — Mintz Levin Cohn Ferris Glovsky and Popeo, P.C.; Steven M. Jensen

(57) ABSTRACT

A communication system comprising at least one communication network node having a capacity for communicating with at least one additional communication network node at a given center frequency; and at least one external frequency converter, external to said node, operative to cause at least one communication network node, from outside said node, to communicate with at least one additional communication network node, at least on occasion, according to a given communication protocol, at at least one converted center (Continued)

frequency which differs from the given center frequency, and also comprising beacon functionality.

19 Claims, 18 Drawing Sheets

(51) Int. Cl.
*H04B 1/74* (2006.01)
*H04L 27/26* (2006.01)

(56) References Cited

U.S. PATENT DOCUMENTS

| | | | |
|---|---|---|---|
| 4,752,939 | A | 6/1988 | Amoroso et al. |
| 4,849,963 | A | 7/1989 | Kawano et al. |
| 4,941,200 | A | 7/1990 | Leslie et al. |
| 5,774,450 | A | 6/1998 | Harada et al. |
| 6,023,491 | A | 2/2000 | Saka et al. |
| 6,980,509 | B1 | 12/2005 | Okada et al. |
| 7,003,291 | B2 | 2/2006 | Zhnag |
| 7,231,197 | B1 | 6/2007 | Fisher |
| 7,522,877 | B1 | 4/2009 | Avellan et al. |
| 7,711,029 | B2 | 5/2010 | Guey |
| 8,942,721 | B1 | 1/2015 | Aragon |
| 2002/0003773 | A1 | 1/2002 | Okada et al. |
| 2002/0034214 | A1 | 3/2002 | Okada et al. |
| 2003/0214919 | A1 | 11/2003 | Kilfoyle et al. |
| 2004/0095902 | A1* | 5/2004 | Laroia .......... H04W 52/34 370/328 |
| 2004/0264548 | A1 | 12/2004 | Miyoshi |
| 2005/0109917 | A1 | 5/2005 | Wong |
| 2005/0181799 | A1 | 8/2005 | Laroia et al. |
| 2006/0002288 | A1 | 1/2006 | Okada et al. |
| 2006/0084441 | A1 | 4/2006 | Dowling |
| 2006/0198292 | A1 | 9/2006 | Yoshii et al. |
| 2006/0222054 | A1 | 10/2006 | Conyers et al. |
| 2006/0223468 | A1 | 10/2006 | Toms et al. |
| 2006/0233276 | A1* | 10/2006 | Green .......... H04B 7/0691 375/267 |
| 2007/0177691 | A1 | 8/2007 | Ruprich |
| 2007/0254592 | A1 | 11/2007 | McCallister et al. |
| 2007/0259636 | A1 | 11/2007 | Fisher |
| 2008/0003948 | A1 | 1/2008 | Mitran |
| 2008/0287081 | A1 | 11/2008 | Van Dam et al. |
| 2009/0017814 | A1 | 1/2009 | Horiuchi et al. |
| 2009/0100165 | A1 | 4/2009 | Wesley, Sr. et al. |
| 2009/0109919 | A1 | 4/2009 | Bertrand et al. |
| 2009/0203385 | A1 | 8/2009 | Khandekar et al. |
| 2009/0232071 | A1 | 9/2009 | Cho et al. |
| 2010/0048155 | A1 | 2/2010 | Wang |
| 2010/0074349 | A1 | 3/2010 | Hyllander et al. |
| 2010/0120397 | A1 | 5/2010 | Kazmi et al. |
| 2010/0167768 | A1 | 7/2010 | Tsutsui |
| 2010/0304665 | A1 | 12/2010 | Higuchi |
| 2010/0322334 | A1* | 12/2010 | Wang .......... H04L 1/0003 375/267 |
| 2011/0081856 | A1 | 4/2011 | Johansson et al. |
| 2011/0150043 | A1 | 6/2011 | Bergervoet et al. |
| 2011/0207495 | A1 | 8/2011 | Gerstenberger et al. |
| 2011/0235647 | A1 | 9/2011 | Baba et al. |
| 2011/0235743 | A1 | 9/2011 | Lee et al. |
| 2011/0286397 | A1 | 11/2011 | Kim et al. |
| 2011/0287802 | A1 | 11/2011 | Ma et al. |
| 2012/0163333 | A1 | 6/2012 | Arnott et al. |
| 2012/0188919 | A1 | 7/2012 | Subasic et al. |
| 2012/0309299 | A1 | 12/2012 | Kimura et al. |
| 2013/0005239 | A1 | 1/2013 | Almgren et al. |
| 2013/0064314 | A1 | 3/2013 | Ko et al. |
| 2013/0094490 | A1 | 4/2013 | Taromaru et al. |
| 2013/0229939 | A1 | 9/2013 | Teyeb et al. |
| 2013/0287152 | A1 | 10/2013 | Wu et al. |
| 2013/0315320 | A1 | 11/2013 | McGowan et al. |
| 2014/0092816 | A1 | 4/2014 | Ito |
| 2016/0099747 | A1 | 4/2016 | Koifman et al. |
| 2016/0112114 | A1 | 4/2016 | Shoshan et al. |

FOREIGN PATENT DOCUMENTS

| | | |
|---|---|---|
| WO | 2011/123696 A1 | 10/2011 |
| WO | 2012/036787 A2 | 3/2012 |
| WO | 2012/124917 A2 | 9/2012 |

OTHER PUBLICATIONS

"Selector," <http://www.encyclopedia.com/humanities/dictionaries-thesauruses-pictures-and-press-releases/selector-0>.
"Meaning of 'selector' in the English Dictionary," <http://dictionary.cambridge.org/dictionary/english/selector>.
"The Multiplexer," Multiplexer (MUX) and Multiplexing Tutorial—Electronics Tutorials, <https://www.electronics-tutorials.ws/combination/comb_2_html>.
"Basic Electronics Tutorials and Revision," <www.electronics-tutorials.ws>.
"Statement-Level Control Structure," Chapter 7, <http://groups.engin.umd.umich.edu/CIS/course.des/cis400/maxim/lectures/chp7.htm>.
"Conditional (computer programming)—Wikipedia," <https://protect-us.mimecast.com/s/dTTbC1wpo0FM7L5JtybctS? domain=en.wikipedia.org>, Oct. 1, 2017.

\* cited by examiner

[[add OFDMA TDD]]

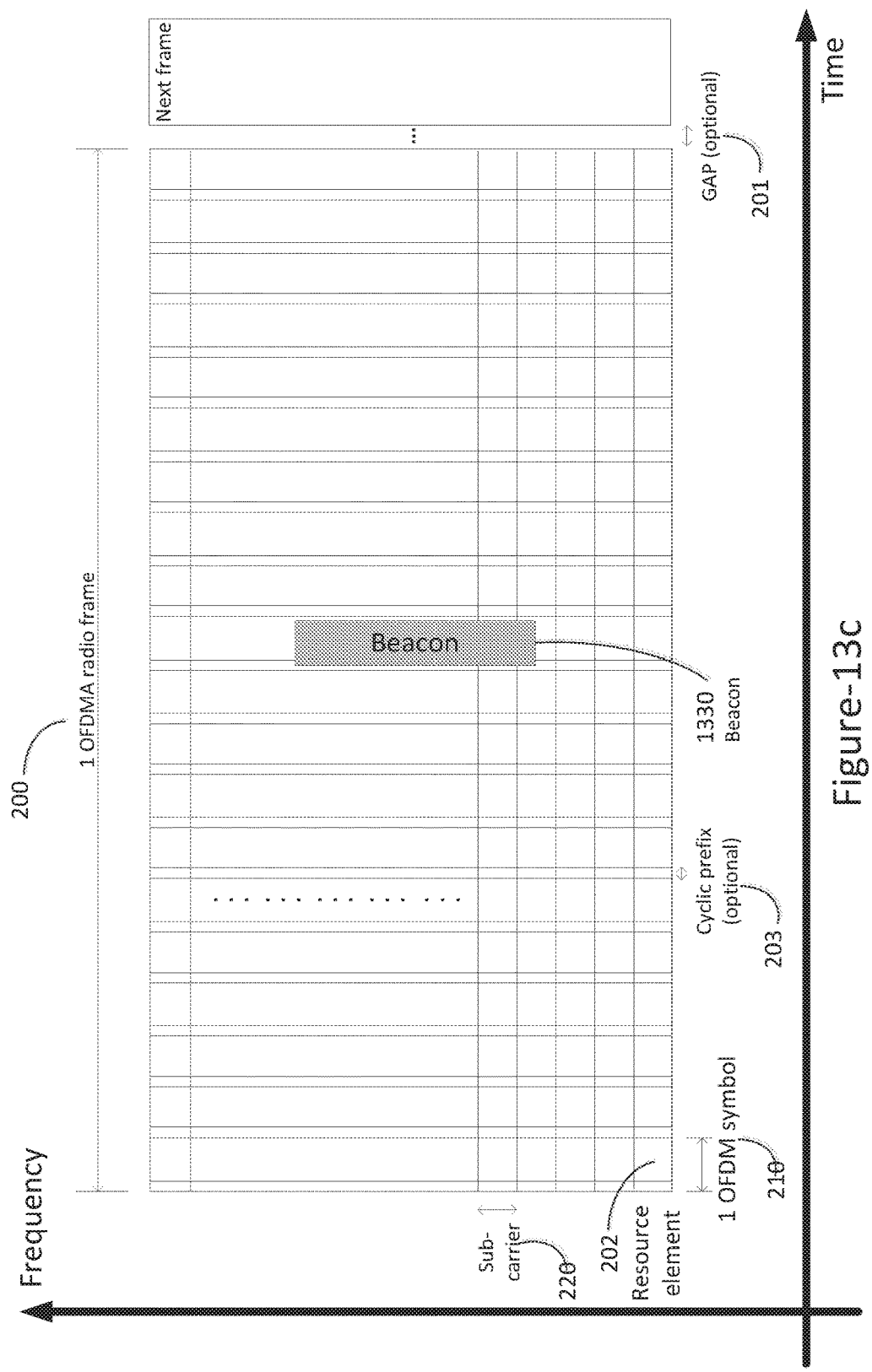

RECEIVER, SYSTEM AND METHOD FOR FREQUENCY DIVERSITY COMMUNICATIONS USING BEACON AND METHODS USEFUL IN CONJUNCTION THEREWITH

REFERENCE TO CO-PENDING APPLICATIONS

This application claims priority from Israel Patent Application No. IL 226511, entitled: "Add-on Apparatus for Frequency Diversity Communications using Beacon and Methods Useful In Conjunction Therewith"; and filed 23 May 2013.

FIELD OF THE INVENTION

The present invention relates generally to wireless communication systems and more particularly to transmission and reception enhancement in wireless communication systems.

BACKGROUND AND SUMMARY OF THE INVENTION

Frequency diversity is a well known technique in the prior art that can be used for better channel adaptation and also for interference mitigation means.

Frequency diversity is a known method for don't-put-all-your-eggs-in-one-basket motivated communications, since any individual fixed frequency may be plagued by noise, interference and so forth. Some protocols provide a certain level of frequency diversity which may or may not be sufficient for particular applications while others provide none.

For example, in the next cellular standard after LTE, the LTE-Advanced, several carriers are used simultaneously for frequency diversity and also to achieve higher throughputs. However, supporting several concurrent channels is difficult to implement because in order to do so, one needs to have multi-channel hardware at both ends (a transmitter and a receiver), which is not a simple task, especially at the handset (mobile station) side. Therefore, there is a need for frequency diversity capability, with easier implementation.

Many communication systems typically use a fixed center frequency. In example, some wireless cellular communication systems such as 2G (CDMA) 3G (WCDMA) and 4G (WiMax, LTE) uses typically fixed center frequency for communications within the cell. Sometimes all cellular networks can be operated using a single fixed center frequency (in case of frequency reuse=1).

Addition of frequency diversity to such systems (having fixed center frequency) can give these systems great advantage, as described above.

In most cases, addition of the frequency diversity ability inside existing equipment (off-the-shelf) can be complex and costly. However, use of an external apparatus allows using various types of off-the-shelf equipment (without any development efforts) from different equipment suppliers.

Therefore, an add-on (external to the transmitter and receiver) apparatus and relevant methods, that enable the addition of frequency diversity ability to communication systems not having such ability, is needed.

It is known that as a communication system moves from one center frequency to another, there is a transient time period which is prone to error, typically both at the transmitter end and at the receiver end, due to the "settling time" required by the hardware to adjust to the new frequency.

A variety of frequency converters are prevalent in the art. Layer 1, 2 and 3 relays are known.

Many different communication protocols such as LTE, 3G UMTS, WiMAX, WiFi, OFDMA, CDMA and TDMA are known.

Receivers which recognize elements of a known protocol, such as cyclic prefixes, are known.

The disclosures of all publications and patent documents mentioned in the specification, and of the publications and patent documents cited therein directly or indirectly, and of specifications of mentioned protocols are hereby incorporated by reference.

Algorithms which lock onto the frequency of a signal are known. These algorithms tend to be more successful when operating on simple signals, or signals having statistical characteristics selected to facilitate rapid measurement of frequency. For example, these algorithms tend to be more successful when operating on CW signals, as opposed to complex information-carrying signals.

SUMMARY OF THE INVENTION

In accordance with an aspect of the presently disclosed subject matter, there is provided a wireless communication system comprising:

at least one wireless communication network node having a capacity for communicating with at least one additional wireless communication network node at a given center frequency; and at least one external frequency converter, external to the node, operative to cause at least one wireless communication network node, from outside the node, to communicate with at least one additional wireless communication network node, at least on occasion, according to a given wireless communication protocol, at at least one converted center frequency which differs from the given center frequency, and also comprising beacon functionality.

In accordance with an embodiment of the presently disclosed subject matter, there is further provided a system wherein the node comprises a base station.

In accordance with an embodiment of the presently disclosed subject matter, there is yet further provided a system wherein the node comprises a mobile station.

In accordance with an embodiment of the presently disclosed subject matter, there is further provided a system wherein the capacity for communicating comprises a transmitting capacity and wherein the converter comprises a Tx frequency converter.

In accordance with an embodiment of the presently disclosed subject matter, there is further provided a system wherein the capacity for communicating comprises a receiving capacity and wherein the converter comprises an Rx frequency converter.

In accordance with an embodiment of the presently disclosed subject matter, there is further provided a system wherein the wireless communication protocol comprises LTE.

In accordance with an embodiment of the presently disclosed subject matter, there is further provided a system wherein the wireless communication protocol comprises WiMax.

In accordance with an embodiment of the presently disclosed subject matter, there is further provided a system wherein the wireless communication protocol comprises a 3G cellular communication protocol.

In accordance with an aspect of the presently disclosed subject matter, there is further provided a wireless communication method comprising providing at least one existing wireless communication network node having a capacity for communicating with at least one additional cellular communication network node at a given center frequency; and retrofitting at least one external frequency converter onto the at least one existing node externally, wherein the converter is operative to cause the at least one existing wireless communication network node, from outside the existing node, to communicate with at least one additional wireless communication network node, at least on occasion, according to a given wireless communication protocol, at at least one converted center frequency which differs from the given center frequency, and also comprising beacon functionality.

In accordance with an aspect of the presently disclosed subject matter, there is further provided a wireless communication system comprising at least one wireless communication network node having a capacity for communicating with at least one additional wireless communication network node at a given center frequency and according to a given wireless communication protocol; and at least one external frequency converter, external to the node, the converter shifting the transmitted signal of the at least one wireless network node from the given center frequency to a first alternative center frequency, wherein the first alternative center frequency is changed from time to time during the communication between the at least one wireless communication network node and the at least one additional wireless communication network node; and wherein the external frequency converter is operative to transmit a beacon signal at a second alternative center frequency, in addition to the transmission of the communication protocol at the first alternative center frequency. The Transmit Frequency Converter (TFC) typically transmits the beacon, irrespective of where it came from.

In accordance with an embodiment of the presently disclosed subject matter, there is further provided a system wherein the second alternative center frequency is different from the first alternative center frequency.

In accordance with an embodiment of the presently disclosed subject matter, there is further provided a system wherein the second alternative center frequency is equal to the first alternative center frequency.

In accordance with an embodiment of the presently disclosed subject matter, there is further provided a system wherein the external frequency converter comprises a beacon generator operative to generate said beacon signal. The beacon may be generated by a component inside the Transmit Frequency Converter (TFC).

In accordance with an embodiment of the presently disclosed subject matter, there is further provided a system wherein the beacon signal is supplied to the external frequency converter from an external system.

In accordance with an embodiment of the presently disclosed subject matter, there is further provided a system wherein the beacon signal is transmitted out of the frequency band of the transmission of the communication protocol.

In accordance with an embodiment of the presently disclosed subject matter, there is further provided a system wherein the beacon signal is transmitted within the frequency band of the transmission of the communication protocol.

In accordance with an embodiment of the presently disclosed subject matter, there is further provided a system wherein the beacon signal is transmitted continuously whenever the communication protocol is transmitted.

In accordance with an embodiment of the presently disclosed subject matter, there is further provided a system wherein the beacon signal is transmitted only during partial intervals of the transmission of the communication protocol.

In accordance with an embodiment of the presently disclosed subject matter, there is further provided a system wherein the beacon signal spans over the whole frequency bandwidth as the transmission of the communication protocol.

In accordance with an embodiment of the presently disclosed subject matter, there is further provided a system wherein the beacon signal spans over only partial frequency bandwidth as the transmission of the communication protocol.

In accordance with an embodiment of the presently disclosed subject matter, there is further provided a system wherein the beacon signal is a CW signal.

In accordance with an embodiment of the presently disclosed subject matter, there is further provided a system wherein the beacon signal is a predetermined signal.

In accordance with an embodiment of the presently disclosed subject matter, there is further provided a system wherein the beacon signal is a single frequency tone.

In accordance with an embodiment of the presently disclosed subject matter, there is further provided a system wherein the beacon signal comprises multiple frequency tones.

In accordance with an embodiment of the presently disclosed subject matter, there is further provided a system wherein the beacon signal is transmitted periodically.

In accordance with an embodiment of the presently disclosed subject matter, there is further provided a system wherein the beacon signal is carrying information.

In accordance with an embodiment of the presently disclosed subject matter, there is further provided a system wherein the beacon signal is a modulated signal carrying information.

In accordance with an embodiment of the presently disclosed subject matter, there is further provided a system wherein the second alternative center frequency is changed from time to time during the communication between the at least one wireless communication network node and the at least one additional wireless communication network node.

In accordance with an embodiment of the presently disclosed subject matter, there is further provided a system wherein the information comprises the first alternative center frequency.

In accordance with an embodiment of the presently disclosed subject matter, there is further provided a system wherein the information comprises the first alternative center frequency for the next change. Typically, the beacon carries information regarding the frequency to be used when the upcoming frequency change occurs.

In accordance with an embodiment of the presently disclosed subject matter, there is further provided a system wherein the information comprises the second alternative center frequency for the next change.

In accordance with an embodiment of the presently disclosed subject matter, there is further provided a system wherein the first and second alternative center frequencies are changed periodically every predetermined time interval.

In accordance with an embodiment of the presently disclosed subject matter, there is further provided a system wherein the first and second alternative center frequencies are taken from a predetermined list of frequencies.

In accordance with an embodiment of the presently disclosed subject matter, there is further provided a system wherein the first and second alternative center frequencies are computed by the external frequency converter.

In accordance with an embodiment of the presently disclosed subject matter, there is further provided a system wherein the first and second alternative center frequencies are configured by means external to the external frequency converter.

In accordance with an embodiment of the presently disclosed subject matter, there is further provided a system wherein the external frequency converter comprises a synchronization detector, operative to detect a predetermined portion of the signal of the communication protocol, and to synchronize the change in the first and second alternative center frequencies during the detected portion of the signal.

In accordance with an embodiment of the presently disclosed subject matter, there is further provided a system wherein the communication protocol comprises LTE cellular communication protocol.

In accordance with an embodiment of the presently disclosed subject matter, there is further provided a system wherein the communication protocol comprises 3G cellular communication protocol.

In accordance with an embodiment of the presently disclosed subject matter, there is further provided a system wherein the communication protocol comprises WiMAX cellular communication protocol.

In accordance with an embodiment of the presently disclosed subject matter, there is further provided a system wherein the communication protocol comprises OFDM communication protocol.

In accordance with an embodiment of the presently disclosed subject matter, there is further provided a system wherein the communication protocol comprises OFDMA communication protocol.

In accordance with an embodiment of the presently disclosed subject matter, there is further provided a system wherein the predetermined portion is a Cyclic Prefix of an OFDM symbol.

In accordance with an embodiment of the presently disclosed subject matter, there is further provided a system wherein the predetermined portion is a Cyclic Prefix of an OFDMA symbol.

In accordance with an embodiment of the presently disclosed subject matter, there is further provided a system wherein the predetermined portion is a GAP between successive frames of the communication protocol.

In accordance with an embodiment of the presently disclosed subject matter, there is further provided a system wherein the communication protocol is a TDD protocol, and wherein the predetermined portion is a GAP between the uplink subframe and the downlink subframe of the communication protocol.

In accordance with an embodiment of the invention there is yet further provided apparatus in which the above features are provided, mutates mutandis, at the receiver end rather than at the transmitter end.

In accordance with an aspect of the presently disclosed subject matter, there is further provided a wireless communication system comprising at least one wireless communication network node having a capacity for communicating with at least one additional wireless communication network node at a given center frequency and according to a given wireless communication protocol; and at least one external frequency converter, external to the node, the converter shifting the received signal of the at least one wireless network node from a first alternative center frequency to the given center frequency, wherein the first alternative center frequency is changed from time to time during the communication between the at least one wireless communication network node and the at least one additional wireless communication network node; and wherein the external frequency converter is operative to receive a beacon signal at a second alternative center frequency.

In accordance with an embodiment of the presently disclosed subject matter, there is further provided a system wherein the second alternative center frequency is different from the first alternative center frequency.

In accordance with an embodiment of the presently disclosed subject matter, there is further provided a system wherein the second alternative center frequency is equal to the first alternative center frequency.

In accordance with an embodiment of the presently disclosed subject matter, there is further provided a system wherein the external frequency converter comprises a beacon receiver operative to receive the beacon signal.

There is thus provided, in accordance with certain embodiments, a cellular communication system comprising at least one cellular communication network node having a capacity for communicating with at least one additional cellular communication network node at a given center frequency; and at least one external frequency converter, external to said node, operative to cause at least one cellular communication network node, from outside said node, to communicate with at least one additional cellular communication network node, at least on occasion, according to a given cellular communication protocol, at at least one converted center frequency which differs from said given center frequency.

The node may comprise a base station and/or a mobile station.

Further in accordance with certain embodiments, the capacity for communicating comprises a transmitting capacity and the converter comprises a Tx frequency converter.

Still further in accordance with certain embodiments, the capacity for communicating comprises a receiving capacity and the converter comprises an Rx frequency converter.

Additionally in accordance with certain embodiments the cellular communication protocol comprises LTE, WiMax or a 3G cellular communication protocol, inter alia.

Also provided, in accordance with certain embodiments, is a cellular communication method comprising providing at least one existing cellular communication network node having a capacity for communicating with at least one additional cellular communication network node at a given center frequency; and retrofitting at least one external frequency converter onto said at least one existing node externally, wherein said converter is operative to cause said at least one existing cellular communication network node, from outside said existing node, to communicate with at least one additional cellular communication network node, at least on occasion, according to a given cellular communication protocol, at at least one converted center frequency which differs from said given center frequency.

BRIEF DESCRIPTION OF THE DRAWINGS

Certain embodiments of the present invention are illustrated in the following drawings:

FIG. 2b depicts a further alternative to the embodiment of FIG. 2a.

FIG. 7a shows the system before using the RFC+TFC and FIG. 7b shows the same system after using the RFC+TFC.

FIG. 13c is an illustration of a beacon signal allocation according to a fifth embodiment of the present invention.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Figure 1A:
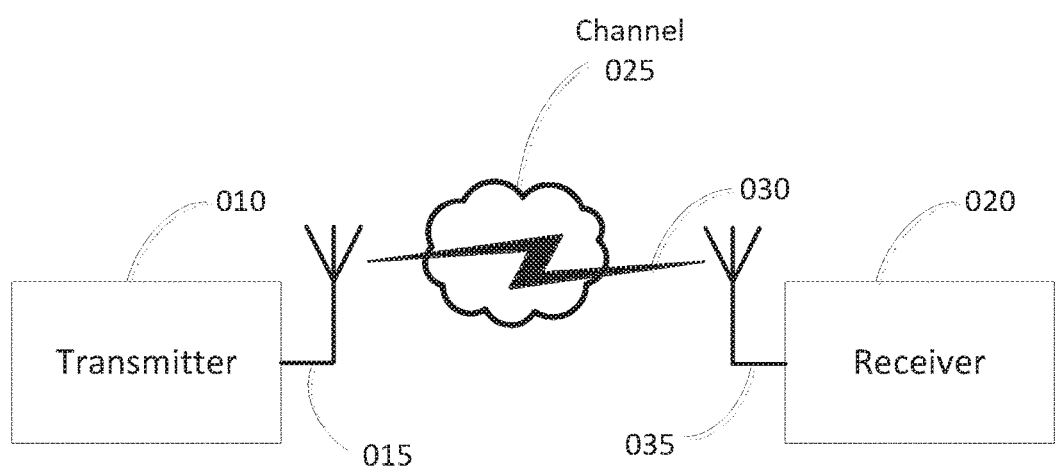
FIG. 1a (Prior Art) depicts a typical wireless communication system comprising a transmitter and a receiver.

FIG. 1a (Prior Art) depicts a typical wireless communication system comprising a transmitter 010 having a transmitting antenna 015, which transmits a wireless signal 030 through a channel 025. The wireless signal is then received e.g. using a receiving antenna 035 by a receiver 020.

Figure 1B:
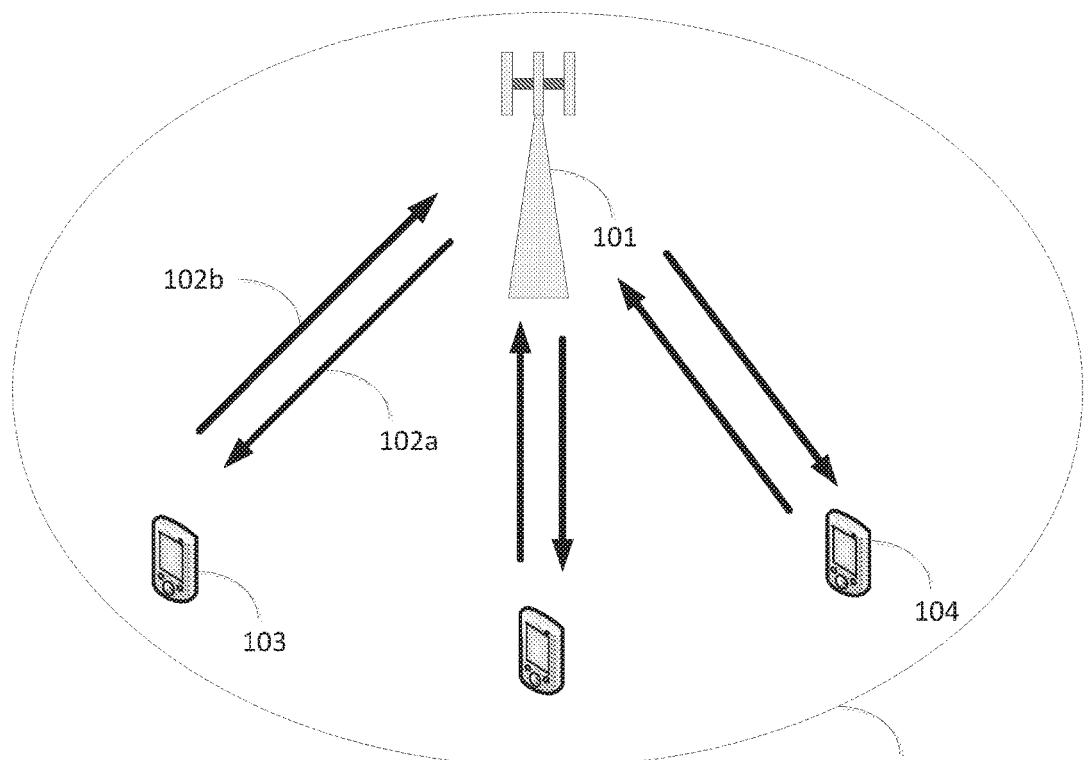
FIG. 1b depicts a typical cell or other network portion in a wireless e.g. cellular communication system.

FIG. 1b depicts a typical cell or other network portion in a wireless e.g. cellular communication system.

This embodiment typically includes a typical cell or other network portion 100 in a wireless e.g. cellular communication system. A base station 101 transmits and receives signals to and from a plurality of mobile stations within its geographical coverage area. Such mobile stations are noted as 103 and 104. Each mobile station typically transmits an Uplink signal 102b to base station 101, and receives a Downlink signal 102a from base station 101. The communication system may be a cellular system, or alternatively any other wireless network.

The wireless (e.g.) communication system may implement one of the cellular standards, one of the wireless communication standards, or may implement some proprietary communication signals and protocols. For example, a cellular communication system may implement the 3GPP LTE standard, the WiMAX standard, the 3GPP WCDMA, HSPA or any other cellular standard. As a further example, the wireless communication system may implement one of the 802.11 WiFi standards.

Downlink 102a and Uplink 102b signals may be transmitted using TDMA, CDMA, FDMA, OFDMA, or any other method or combination of methods.

Figure 1C:
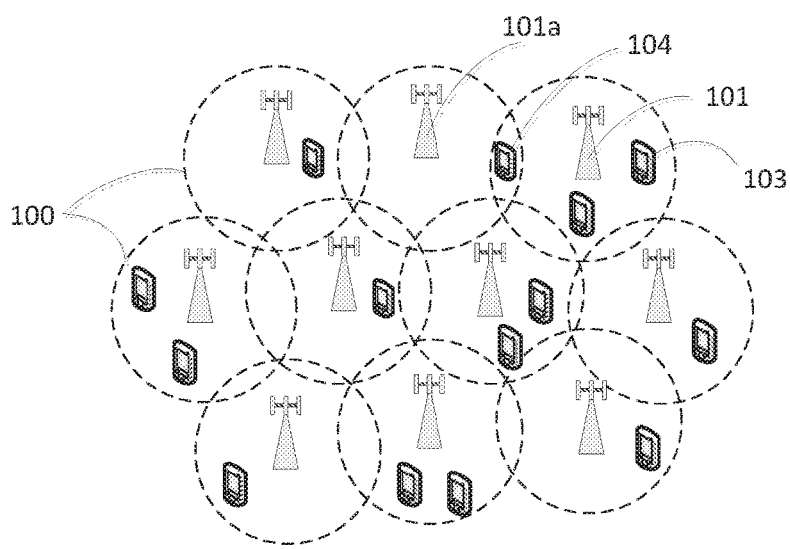
FIG. 1c depicts a cellular system comprising a plurality of cells; each of the cells e.g. as described above with reference to FIG. 1b.

FIG. 1c depicts a cellular system comprising a plurality of cells, each of the cells e.g. as described above with reference to FIG. 1b.

This embodiment typically includes a cellular system comprising a plurality of cells 100, each of which is described above regarding FIG. 1b. Some of the mobile stations may receive the downlink signals from their serving base stations in low quality. Such low quality signals may be caused by multipath, fading, inter-cell interferences, attenuation, or any other cause or combination of such. In such conditions, it may be difficult for the mobile station to maintain proper reception of the downlink signals from the base station.

For example, in one of the cells, base station 101 serves the mobile stations 103 and 104, amongst other mobile stations. Mobile station 104 also resides within the geographical coverage area of base station 101*a*; therefore mobile station 104 receives downlink signals from 2 base stations 101 and 101*a*, which causes lower quality reception of the desired downlink signal from base station 101.

Typically, in a cellular or wireless communication system, some of the downlink transmissions may include portions which are more critical than other portions. Such critical portions are referred to as "Critical Regions" herein below.

One example of a Critical Region is downlink synchronization signals, which are critical for the proper reception of the remaining downlink transmission. Another example is control and management messages, such as but not limited to, for example, the DL-MAP signal in WiMAX, the PDCCH signal in LTE and CCPCH signal in 3G UMTS, that the base station sends to the mobile stations; such control and management messages may be critical for proper reception of the downlink transmission.

Another example of a Critical Region is a portion of a downlink signal addressed to a mobile station which receives the downlink transmission in low quality, as described above. Another example is a portion of a downlink signal addressed to a mobile station which is a preferred mobile station (e.g. is deemed to have greater importance or higher priority over the other mobile stations).

Such Critical Regions may vary from time to time, or from frame to frame. Such variations may be for example in the content (information) carried by the critical region, or in the critical region allocation within the frame.

Alternatively, the Critical Regions may be fixed, either by their content or by their allocation. Further alternatively, the Critical Regions may vary slowly, for example be fixed for several consecutive frames and then be changed.

Figure 6:
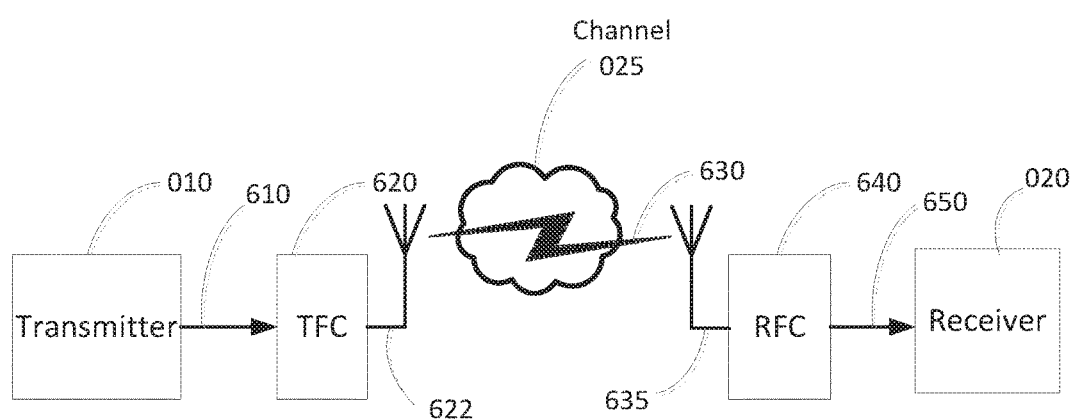
FIG. 6 depicts a wireless communication system incorporating an add-on frequency diversity couple apparatuses at the transmitter side (TFC) and at the receiver side (RFC).

FIG. 6 depicts a wireless communication system incorporating an add-on frequency diversity couple apparatuses at the transmitter 010 side (Transmit Frequency Converter (TFC) 620) and at the receiver 020 side (Receive Frequency Converter (RFC) 640) according to an embodiment of the present invention. Transmitter 010 typically resides in a wireless communication network node, e.g. 101, 103 or 104 of FIG. 1*b*. Receiver 020 typically resides in an additional wireless communication network node. For example, transmitter 010 may reside in mobile node 103 and receiver 020 may reside in base station 101. Typically, transmitter 010 has the capacity to communicate with receiver 020 over channel 025 according to a given communication protocol, e.g. LTE, WiMAX, WiFi, 3G cellular, Bluetooth, etc. The communication protocol may optionally be an OFDM, OFDMA, CDMA, TDMA, FDMA protocol. Typically, transmitter 010 has the capacity to communicate with receiver 020 at a given ("original") center frequency.

At the transmitter side a Transmit Frequency Converter (TFC) 620 may be added. The interface 610 between the transmitter 010 and the Transmit Frequency Converter (TFC) 620 may be optionally at the RF frequency (e.g. the prior antenna interface at high power or at the RF frequency at low power before the power amplifier). Optionally it may be implemented at the IF (intermediate frequency). Optionally it may be implemented at the base-band. At the receiver side, a Receive Frequency Converter (RFC) 640 may be added. Accordingly, the interface between the Receive Frequency Converter (RFC) 640 and the receiver 020 may be optionally in accordance with all the alternatives described above regarding the Transmit Frequency Converter (TFC) 620. The function of the Transmit Frequency Converter (TFC) is to convert the original center frequency of the signal transmitted by the transmitter 010 to a shifted center frequency (also referred to as "alternative center frequency" or "first alternative center frequency"). The Transmit Frequency Converter (TFC) 620 is then typically connected to a transmitting antenna 622 that typically covers all the shifted frequencies that are implemented by the Transmit Frequency Converter (TFC). Optionally, additional components may be added between the Transmit Frequency Converter (TFC) and the antenna, e.g. a PA (Power Amplifier) and/or filters. In a similar manner, the receiving antenna 635 also typically covers all the shifted frequencies and then is typically interfaced to Receive Frequency Converter (RFC) 640 which typically re-converts the shifted center frequency to the original center frequency. Thereafter, the signal 650 which has the original center frequency is received correctly by the receiver 020. Optionally, additional components may be added between the Receive Frequency Converter (RFC) and the antenna, e.g. a LNA (Low Noise Amplifier) and/or filters.

Typically, Transmitter 010 and Receiver 020 are standard apparatuses, and may be off-the-shelf equipment operative to communicate with each other.

Typically, the frequency conversion (shift) varies in time, e.g. such that a different frequency shift is performed by the Transmit Frequency Converter (TFC) and Receive Frequency Converter (RFC) over time, e.g. the alternative center frequency is changed from time to time during the communication between the receiver 020 and the transmitter 010. Optionally, a new frequency shift is performed periodically e.g. every predetermined time interval. Optionally, a new frequency shift is performed non-periodically, e.g. according to a predetermined control. Optionally, a new frequency shift is performed during non-critical regions of the transmission, thus minimizing the interference and the degradation to the received transmission. Examples for placing a frequency shift at non critical regions of the transmission are further described regarding FIGS. 2-5 below.

Optionally, the frequency shift is taken from a predetermined list of frequency shifts. Further optionally, the frequency shift is selected consecutively from said list. Alternatively, the frequency shift is taken or configured from an external system. Alternatively, the frequency shift is computed according to a predetermined algorithm. Alternatively, a beacon generator may generate several signals e.g. simultaneously, and these together may constitute a beacon.

Figure 7A:
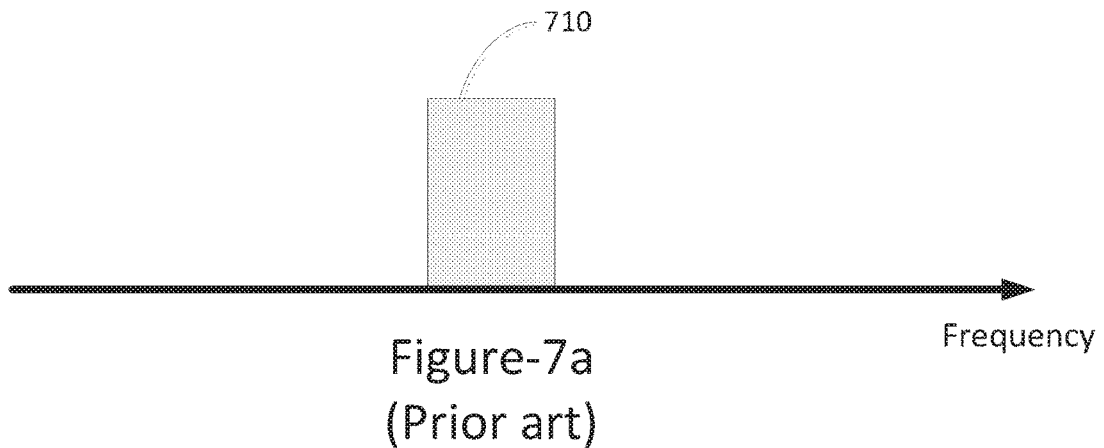
FIGS. 7a-7b are simplified illustrations of the frequency behavior effect when using the add-on frequency diversity apparatuses (RFC+TFC). In particular.
Figure 7B:
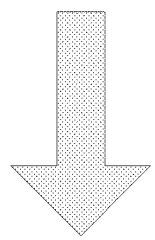

FIGS. 7*a*-7*b* are simplified illustrations of the frequency behavior effect when using the add-on frequency diversity apparatuses (RFC+TFC). FIG. 7*a* (Prior art) depicts the situation before using the RFC+TFC. It may be seen that the original center frequency 710 is static in the frequency domain.

FIG. 7*b* depicts the situation after using the RFC+TFC, according to an embodiment of the present invention. It illustrates an example of the shifted center frequencies. It may be seen that the shifted center frequency is shifted to different center frequencies over time. In time period=1 (T=1) 720 the shifted center frequency is F1. In time period=2 (T=2) 760 the shifted center frequency is F5. In time period=3 (T=3) 730 the shifted center frequency is F2. In time period=4 (T=4) 740 the shifted center frequency is F3. In time period=5 (T=5) 750 the shifted center frequency is F4.

Figure 2A:
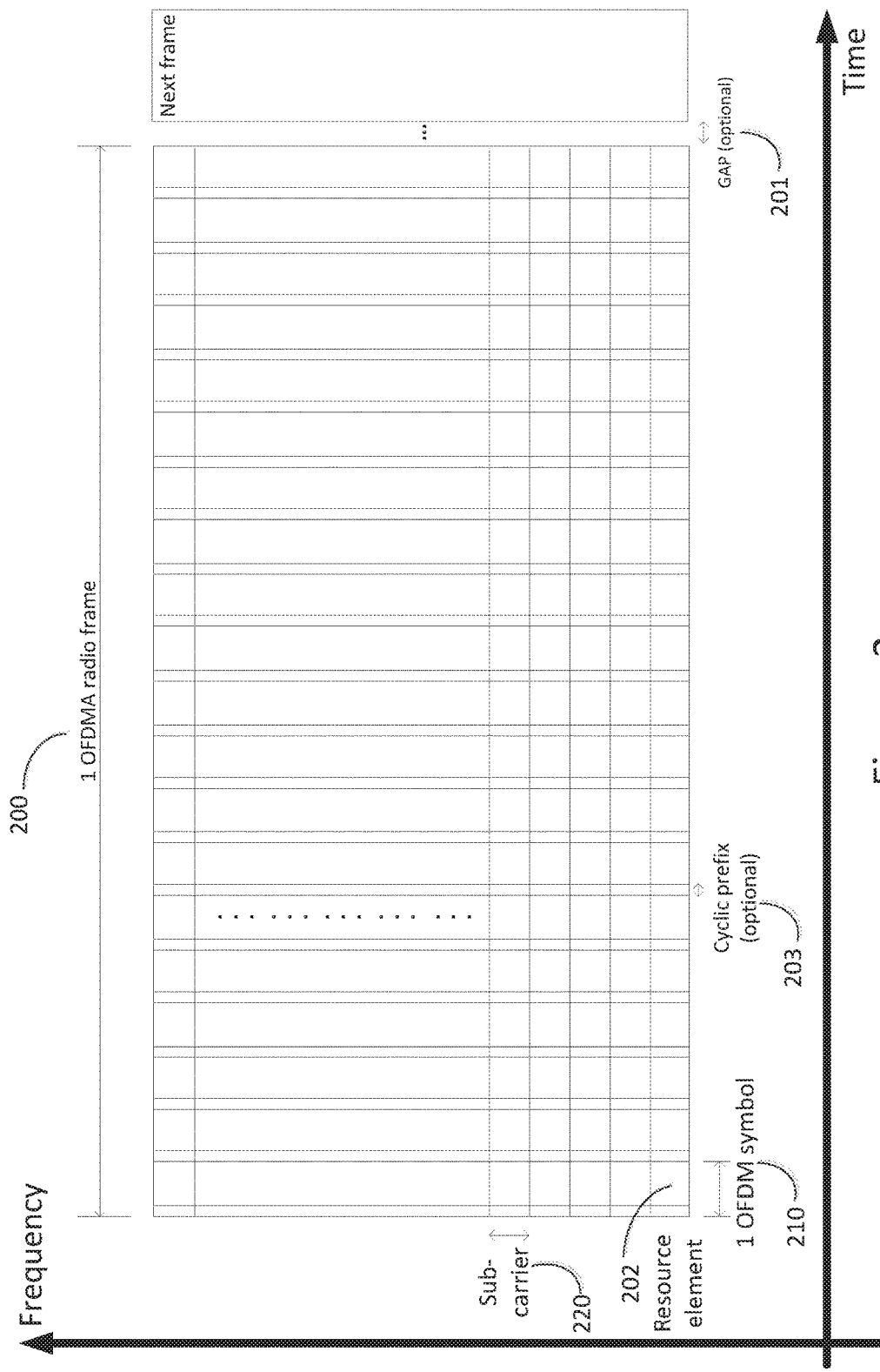
FIG. 2a depicts an OFDMA radio frame (either downlink or uplink), in an OFDMA FDD communication system implementing add-on frequency diversity according to certain embodiments of the invention.
Figure 2B:
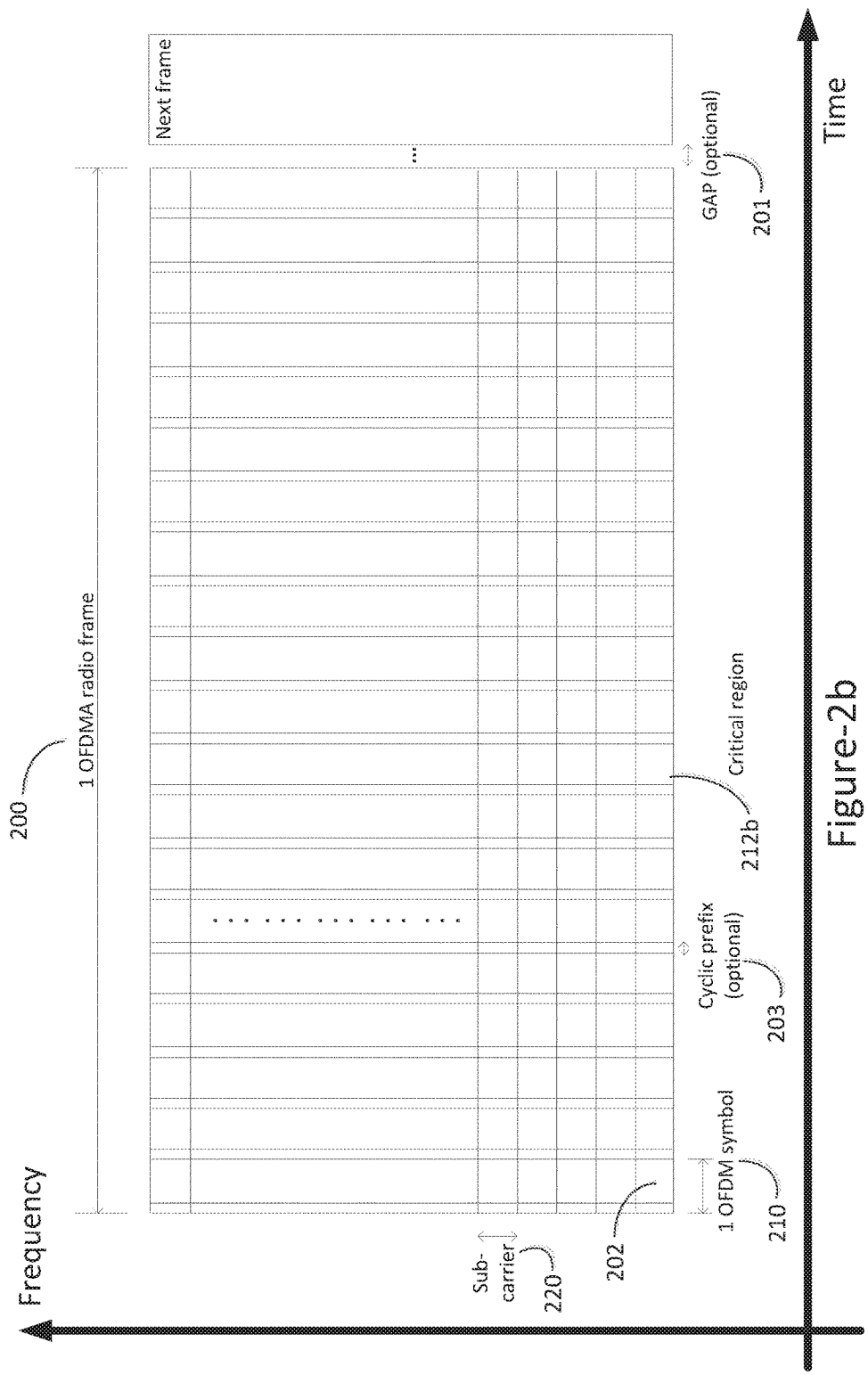

FIG. 2*a* depicts an OFDMA/OFDM radio frame 200 (either downlink or uplink), in an OFDMA FDD communication system implementing add-on frequency diversity according to certain embodiments of the invention.

This embodiment typically includes an OFDMA (or OFDM) radio downlink frame 200, in an OFDMA (or OFDM) communication system. Frame 200 typically comprises a plurality of OFDM symbols 210 in the time domain, and/or a plurality of subcarriers 220 in the frequency domain. An optional Gap 201 may be placed between successive frames 200. An optional Cyclic Prefix 203 may be provided e.g. between successive OFDM symbols in the time domain. A basic resource which may be allocated in the downlink transmission frame is resource element 202, which is the transmission of one subcarrier during one OFDM symbol length in time.

Figure 7B:
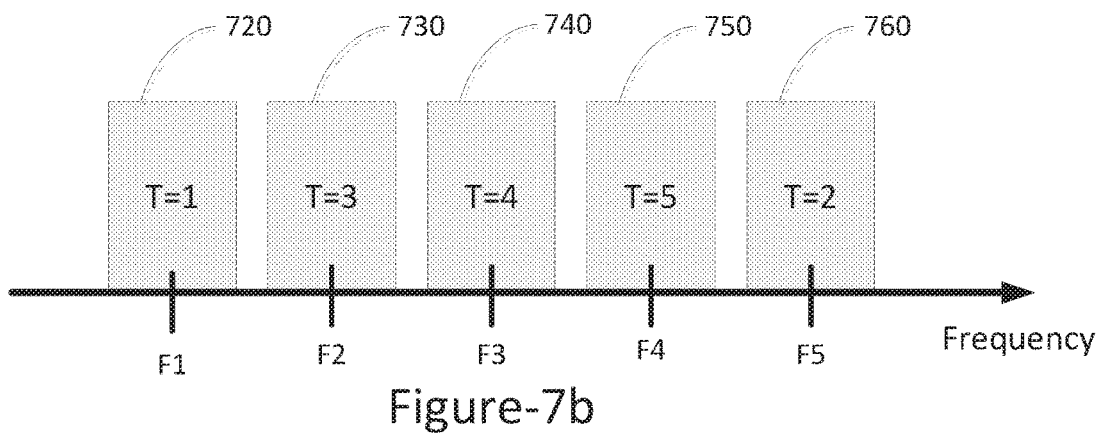

In the OFDMA (or OFDM) frame 200 there are several locations (in the time domain) that the frequency conversion/shift, e.g. as described above with reference to FIGS. 6-7, may be implemented. Each of these locations typically implements a different frequency shift rate. For example, the frequency shift may be performed during the cyclic prefix (CP) 203 of an OFDM/OFDMA symbol 210. The frequency shift may be performed during the cyclic prefix (CP) of every symbol or during the cyclic prefix (CP) of every several symbols. Alternatively, the frequency shift may be implemented during un-important symbol duration (or during empty symbol—a symbol time that no data is transmitted). Alternatively, the frequency shift may be implemented during the time gap 201 between consecutive frames. Each of the above examples may be regarded as a "non-critical region" of the transmission, in that improper reception of these regions is not as harmful to the receiver as other (critical) regions.

In another embodiment of the present invention which includes an OFDMA radio frame, an OFDMA TDD (Time Division Duplex) communication system add-on frequency diversity is implemented according to certain embodiments of the invention. In the TDD system, both DL (downlink) and UL (uplink) frames may occupy the same frequency (center frequency) and are typically transmitted alternately. Between each one of these two frames there are typically guard gaps (e.g. between DL and UL, and between UL and DL). In each one, e.g., of these guard gaps the frequency conversion/shift realizing the frequency diversity may be implemented. In this implementation, the rate of the conversions is therefore typically the frames' shift rate. Typically, all locations in the frame described in FIG. 2a may also be used in the TDD system.

Figure 3A:
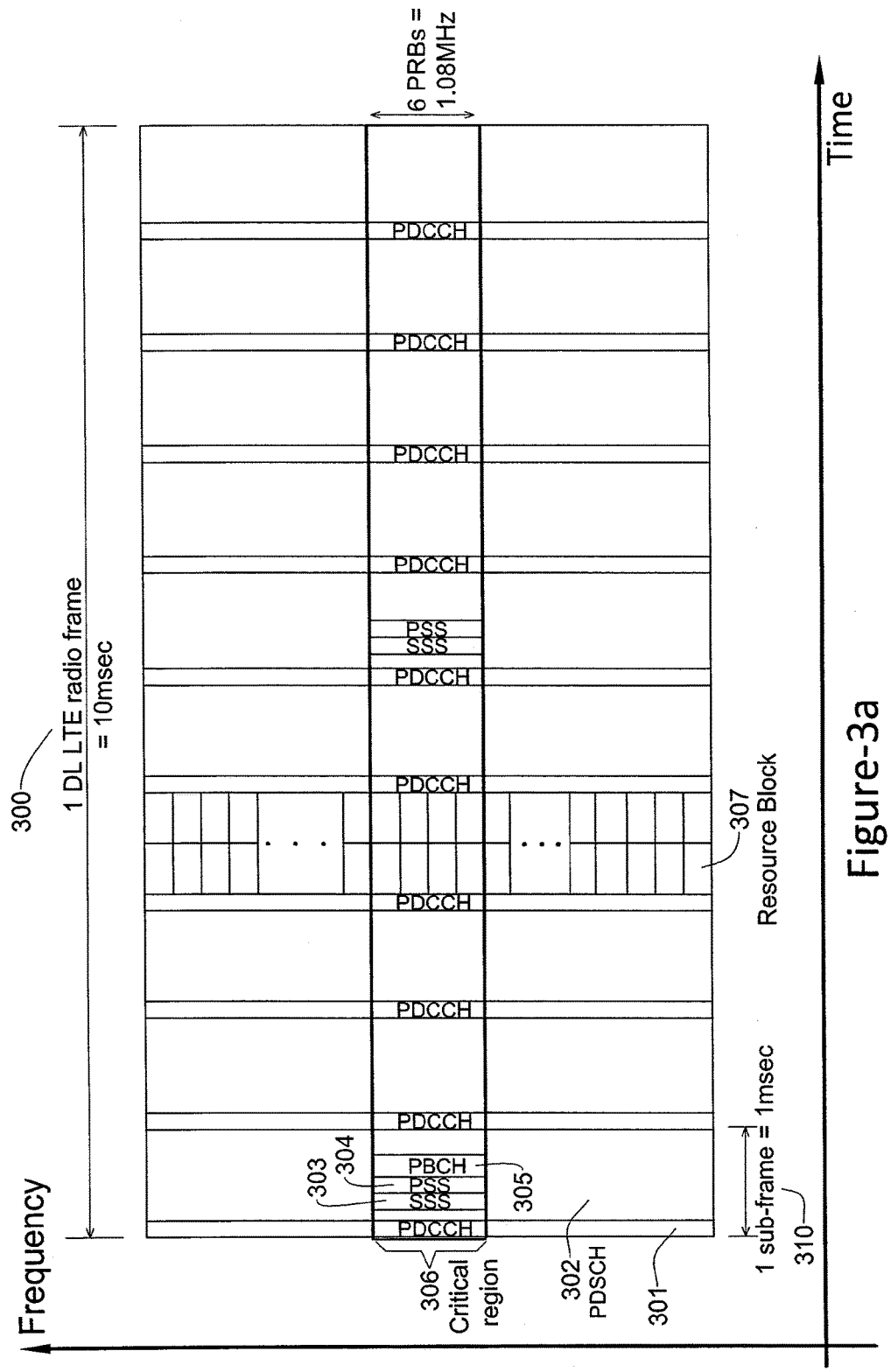
FIG. 3a depicts LTE FDD radio frame (either downlink or uplink) implementing add-on frequency diversity according to embodiments of the invention.

FIG. 3a depicts an LTE FDD radio frame (either downlink or uplink) implementing add-on frequency diversity according to embodiments of the invention. The embodiment of FIG. 3a illustrates an LTE radio downlink (DL) frame 300 which has a duration of, say, 10 msec, in an LTE cellular communication system. Frame 300 typically comprises a plurality of LTE physical resource blocks (PRBs) 307 which may for example be a subset of 6 OFDMA symbols in time and 12 sub-carriers in frequency. The DL (downlink) frame also comprises LTE sub-frames such as that shown at reference numeral 310 (its duration is, say, lmsec). The LTE DL (downlink) frame in the illustrated embodiment, is of the FDD (Frequency Division Duplex) type, however TDD (Time Division Duplex) type of DL (downlink) frames may be employed similarly.

As shown, the LTE DL (downlink) frame includes several physical channels or signals e.g. some or all of: Physical DL (downlink) Control Channel (PDCCH) 301, Physical DL (downlink) Shared Channel (PDSCH) 302, Secondary Synchronization Signal (SSS) 303, Primary Synchronization Signal (PSS) 304 and Physical Broadcast Channel (PBCH) 305. Each of these channels or signals or any subset thereof may be deemed critical to LTE system operation.

Since LTE FDD is OFDMA, then the locations for the frequency shift in the frame that were described above regarding FIG. 2a may also be used in the LTE FDD system.

A further embodiment of the present invention includes an LTE TDD radio frame implementing add-on frequency diversity. Since LTE TDD is OFDMA, then all the locations for the frequency shift in the frame that were described above regarding OFDMA TDD may also be used in the LTE TDD system.

Figure 4A:
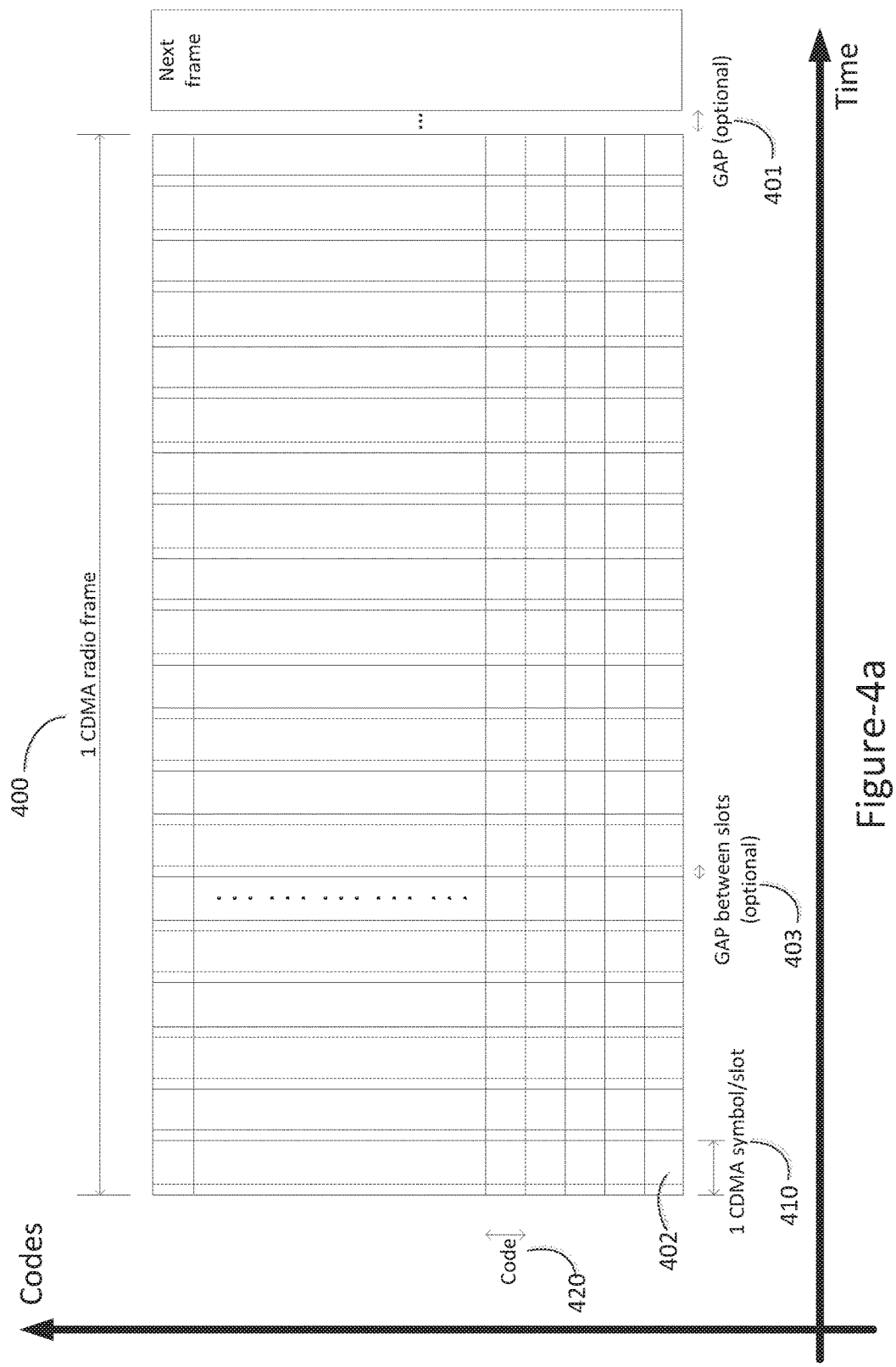
FIG. 4a depicts a CDMA FDD radio frame (either downlink or uplink), in a CDMA communication system implementing add-on frequency diversity according to certain embodiments of the invention.

FIG. 4a depicts a CDMA FDD radio frame (either downlink or uplink), in a CDMA communication system implementing add-on frequency diversity according to certain embodiments of the invention. In the CDMA frame 400 there are several locations (in the time domain) that the frequency conversion/shift may be implemented. Each of these locations typically implements different frequency shift rates. For example, the frequency shift may be implemented during the gap between slots/symbols 403 of a CDMA symbol/slot 410. The frequency shift may be implemented every symbol/slot or every several symbols/slots. Alternatively, the frequency shift may be implemented during un-important symbol/slot duration (or during empty symbol/slot—a symbol/slot time that no data is transmitted).

Alternatively the frequency shift may be implemented during the time gap 401 between consecutive frames. Each of the above examples may be regarded as a "non-critical region" of the transmission, in that improper reception of these regions is not as harmful to the receiver as other (critical) regions.

Another embodiment of the present invention includes a CDMA TDD radio frame in a CDMA communication system implementing add-on frequency diversity according to certain embodiments of the invention. In the TDD system, both DL (downlink) and UL (uplink) frames occupy the same frequency (center frequency) and are transmitted alternately. Between each one of these two frames there are typically guard gaps (e.g. between DL and UL, and/or between UL and DL). In each one, typically, of these guard gaps the frequency conversion/shift realizing the frequency diversity may be implemented. In this implementation, the rate of the conversions is therefore typically the frames' shift rate. All the locations in the frame that were described in FIG. 4a may also be used in the TDD system.

Figure 5:
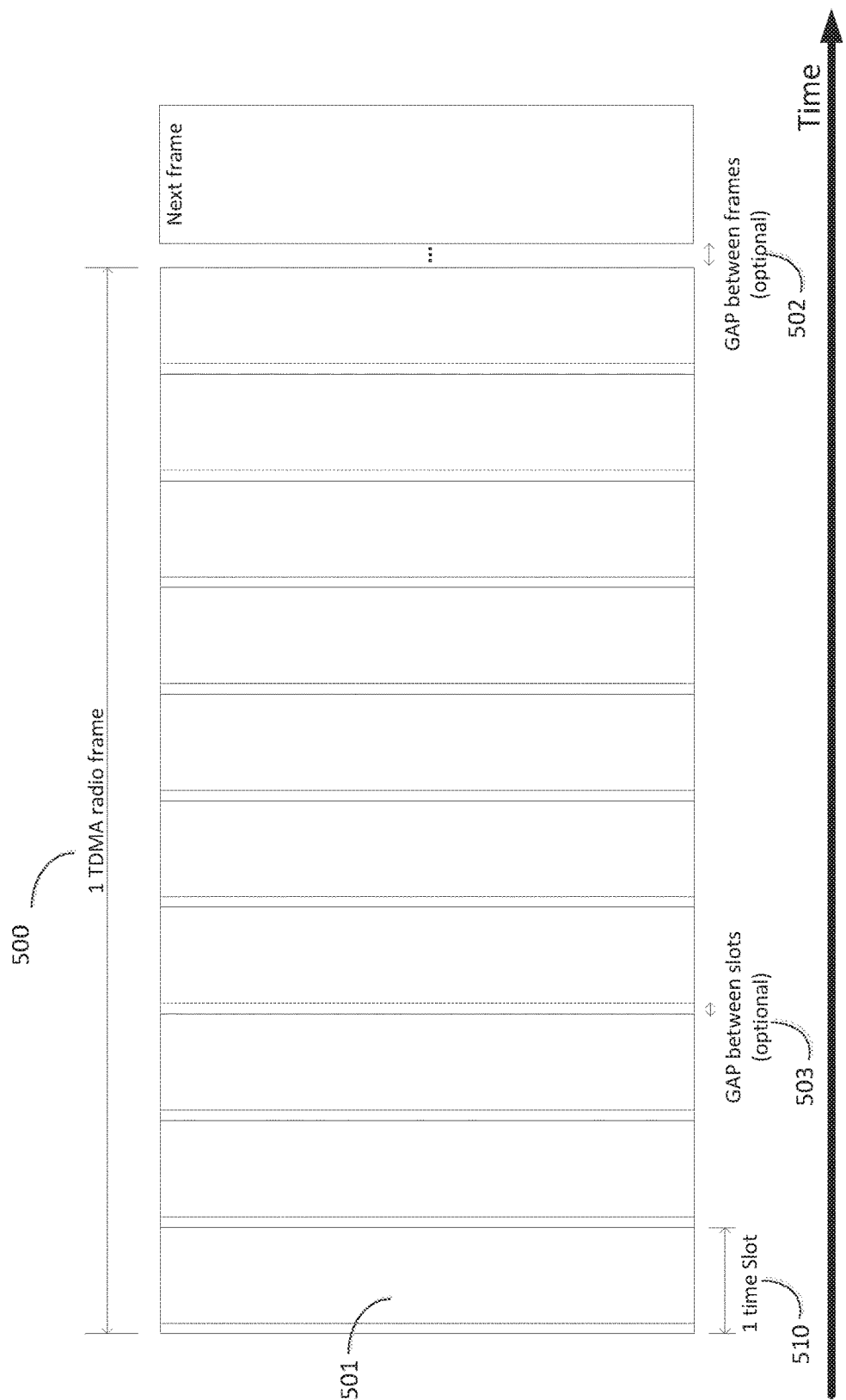
FIG. 5 depicts a TDMA radio frame, in a TDMA communication system implementing add-on frequency diversity according to certain embodiments of the invention.

FIG. 5 depicts a TDMA radio frame, in a TDMA communication system implementing add-on frequency diversity according to certain embodiments of the invention. In the TDMA frame 500 there are several locations (in the time domain) that the frequency conversion/shift may be implemented. Each of these locations typically implements different frequency shift rates. For example, the frequency shift may be implemented during the gap between slots 503 of a TDMA symbol 510. The frequency shift may be implemented every slot or every several slots. Alternatively, the frequency shift may be implemented during un-important slot duration (or during empty slot—a slot time that no data is transmitted). Alternatively, the frequency shift may be implemented during the time gap 501 between consecutive frames. Each of the above examples may be regarded as a "non-critical region" of the transmission, in that improper reception of these regions is not as harmful to the receiver as other (critical) regions.

Figure 8:
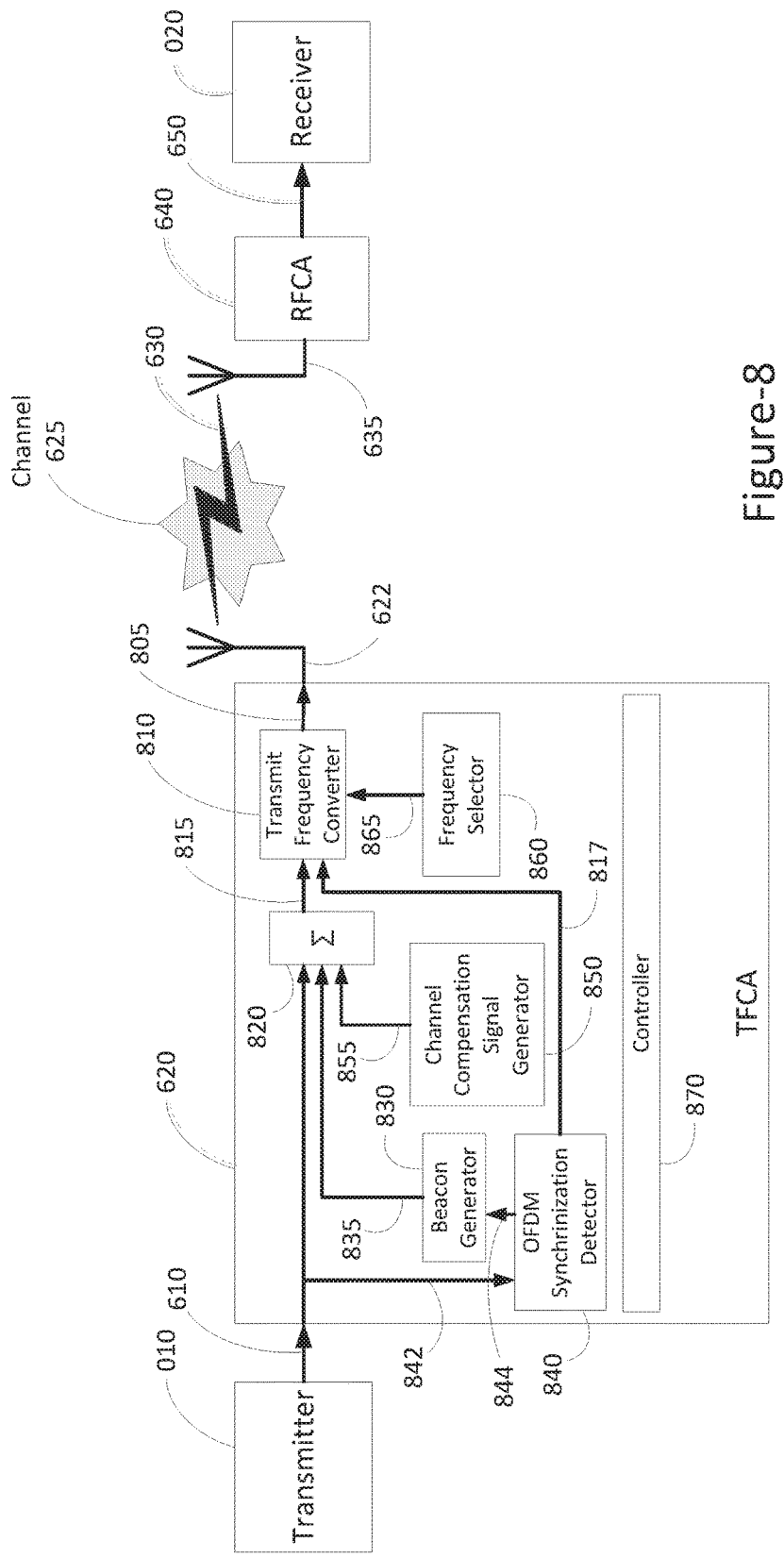
FIGS. 8, 9 are diagrams of systems useful for providing and/or utilizing Add-on Synchronization functionality for Frequency Diversity Communications, in accordance with certain embodiments.
Figure 11:
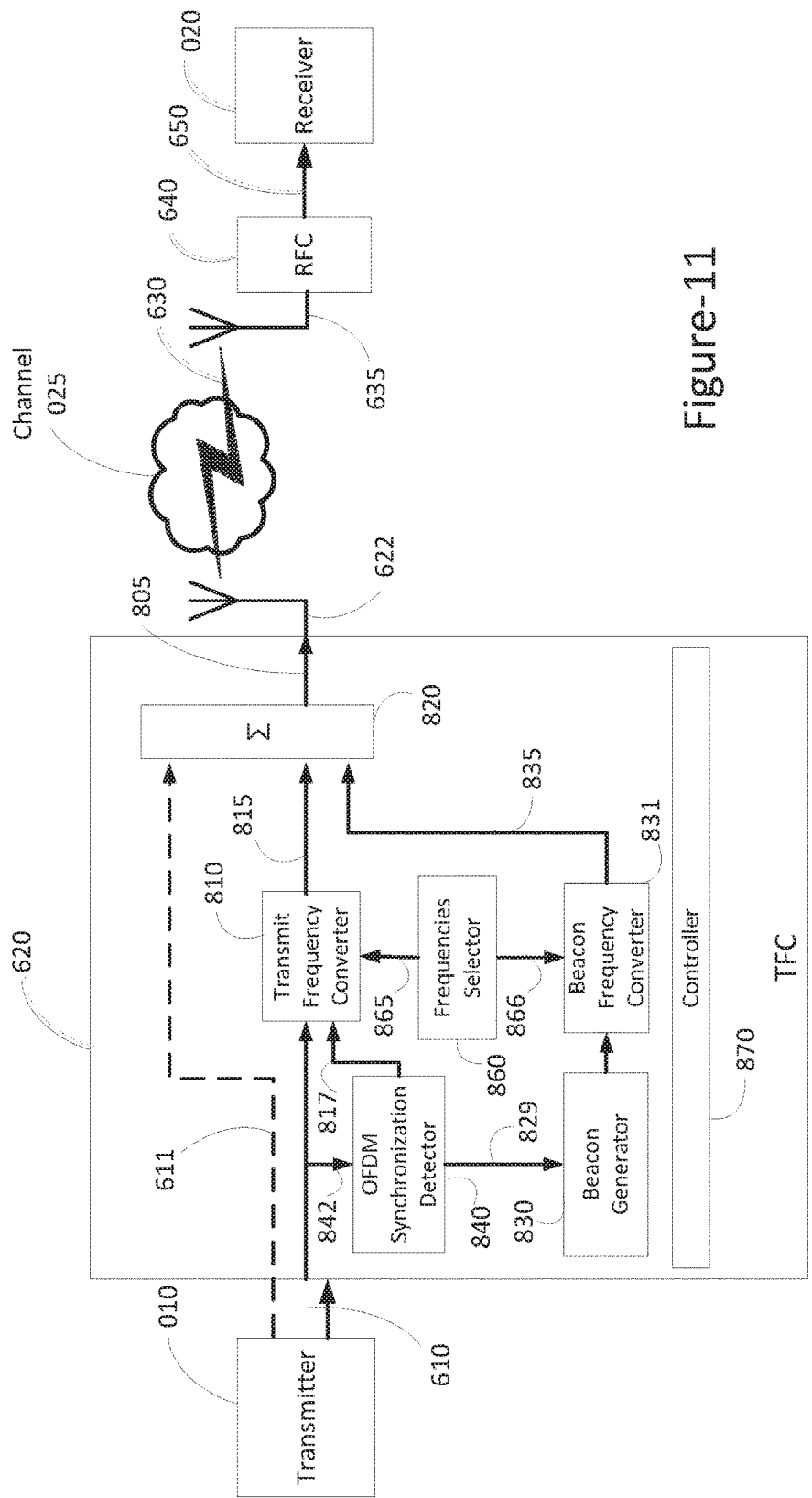
FIG. 11 is a block diagram of an example implementation of the Transmit Frequency Converter (TFC) portion of the add-on frequency diversity apparatus comprising a beacon generator, according to an embodiment of the present invention.

FIG. 11 depicts a more detailed block diagram of an example of the Transmit Frequency Converter (TFC) portion of the add-on frequency diversity apparatus comprising a beacon generator, according to a further embodiment of the present invention. In this embodiment, Transmit Frequency Converter (TFC) 620 comprises a synchronization detector 840, a transmit frequency converter 810, and optionally a frequency selector 860. In the case of an OFDM communication protocol, synchronization detector 840 is an OFDM synchronization detector, as depicted in FIG. 8*a*, operative to detect predetermined portions of the OFDM signal. Alternatively, in the case of a CDMA communication protocol, synchronization detector 840 is a CDMA synchronization detector, operative to detect predetermined portions of the CDMA signal. Alternatively, according to the communication protocol, synchronization detector 840 is operative to detect predetermined portions of the relevant communication protocol signal.

Typically, synchronization detector 840 is operative to detect predetermined portions of the relevant communication protocol signal in which the frequency conversion/shift may be implemented, as described above regarding FIGS. 2-7. Typically, upon detection of said predetermined portion, the synchronization detector 840 synchronizes the transmit frequency converter 810 to perform a change in the alternative center frequency, e.g. to perform a change in the active frequency shift. Transmit frequency converter 810 is the actual component that performs the frequency conversion. The new alternative center frequency may optionally be determined by a frequency selector 860. Further optionally, a controller 870 resides in Transmit Frequency Converter (TFC) 620, for controlling the operation of its process. Optionally, the change in the alternative center frequency is made upon several consecutive detections of said predetermined portion. Further optionally, the change in the alternative center frequency is determined by some predefined criteria taking into account the detection of said predetermined portion.

Optionally, said predetermined portions of the signal, in which the frequency conversion/shift may be implemented, are "non-critical regions" of the transmission, in that improper reception of these portions/regions is not as harmful to the receiver as other (critical) regions. Some examples of such portions/regions are described above regarding FIGS. 2-5, and also hereinbelow.

Some examples of the operation of the synchronization detector 840 are:
  a. In the case of a OFDM or OFDMA communication protocol, the synchronization detector 840 may be operative to detect the Cyclic Prefix (CP) of the OFDM/OFDMA symbols, and to synchronize the transmit frequency converter 810 to perform a change in the alternative center frequency during the transmission of the CP.
  b. In the case of a frame-based communication protocol, where a GAP or some guard period is placed between successive frames, the synchronization detector 840 may be operative to detect said GAP or guard period, and to synchronize the transmit frequency converter 810 to perform a change in the alternative center frequency during said GAP or guard period.
  c. In the case of a TDD communication protocol, where a GAP or some guard period is placed between the uplink subframe and the downlink subframe, the synchronization detector 840 may be operative to detect said GAP or guard period, and to synchronize the transmit frequency converter 810 to perform a change in the alternative center frequency during said GAP or guard period.
  d. In the case of a frame-based communication protocol, where an empty region (e.g. empty symbol as described above) is placed within the frames, the synchronization detector 840 may be operative to detect the empty region, and to synchronize the transmit frequency converter 810 to perform a change in the alternative center frequency during the empty region.
  e. In the case of a frame-based communication protocol, where a preamble or other known signal is placed within the frame, the synchronization detector 840 may be operative to detect the preamble or other known signal, and to synchronize the transmit frequency converter 810 to perform a change in the alternative center frequency during non-critical regions (e.g. un-important symbol duration as described above).

In one embodiment of the present invention, an additional auxiliary signal is transmitted by Transmit Frequency Converter (TFC) 620 to be received by Receive Frequency Converter (RFC) 640, e.g. to help Transmit Frequency Converter (TFC) 620 and Receive Frequency Converter (RFC) 640 to better coordinate their operation, e.g. as described below. This signal, or any similar signal which facilitates coordination of such operations, may be termed a "Beacon" signal.

Typically, Transmit Frequency Converter (TFC) 620 comprises a beacon generator 830, which generates the Beacon signal. Alternatively or in addition, the Beacon signal may be generated by an external source.

Optionally this Beacon signal may be predetermined or may vary over time, or have a portion which varies, and another portion which is predetermined.

Typically, the Beacon signal is transmitted at a second alternative center frequency. The transmission of the beacon signal is in addition to the transmission of the communication protocol at the first alternative center frequency. First and second alternative frequencies may be the same frequencies, and may be different frequencies.

Typically, the Beacon signal may be used by the Receive Frequency Converter (RFC) for some or all of various aims, for example:
  1. This Beacon signal may be used for better frequency estimation and synchronization.
  2. This Beacon signal may be used for better timing estimation and synchronization.
  3. This Beacon may be used for delivering control data between the network nodes (e.g. between the Transmit Frequency Converter (TFC) and the Receive Frequency Converter (RFC)). Such control data is, for example, the next frequency shift of the main signal and/or the Beacon signal (or the next frequency shifts list) that will be executed by the Transmit Frequency Converter (TFC). Another example of such control data is the location within the frame that the frequency shift will occur (examples of such locations/portions are described above with regard to FIGS. 2-5).

The Beacon Generator 830 may optionally interface 829 the Synchronization Detector 840 such that relevant inputs from the Synchronization Detector 840 can be provided to the Beacon Generator 830. These inputs and information may be, for example, the inputs described in the examples of the operation of the synchronization detector 840 above (such as the inputs from the Synchronization Detector 840 to the transmit frequency converter 810).

After generating the Beacon signal at the Beacon Generator 830, the Beacon signal is typically converted to a Beacon desired frequency by the Beacon Frequency Converter 831.

The new Beacon center frequency may optionally be determined by a frequency selector 860. Further optionally, a controller 870 resides in Transmit Frequency Converter (TFC) 620, for controlling the operation of its process. Optionally, the change in the alternative Beacon center frequency is made upon several consecutive detections of said predetermined portion. Further optionally, the change in the alternative Beacon center frequency is determined by some predefined criteria taking into account the detection of said predetermined portion.

Optionally, the center frequency can be fixed over a period time. Further optionally, the frequency shift of the Transmit Frequency Converter 810 and the Beacon Frequency Converter 831 are the same (the same frequency that, e.g. the Frequencies Selector provides these two converters at a certain time).

Optionally, said beacon signal may be a Continuous Wave (CW), a signal frequency tone, a multiple of tones, or any other predetermined signal. Further optionally, the beacon signal may be transmitted periodically.

Alternatively, the beacon signal may be a modulated signal, carrying information. Such information may be, for example, the current first alternative center frequency, the first alternative center frequency for the next change, the second alternative center frequency for the next change, etc.

Figure 9:
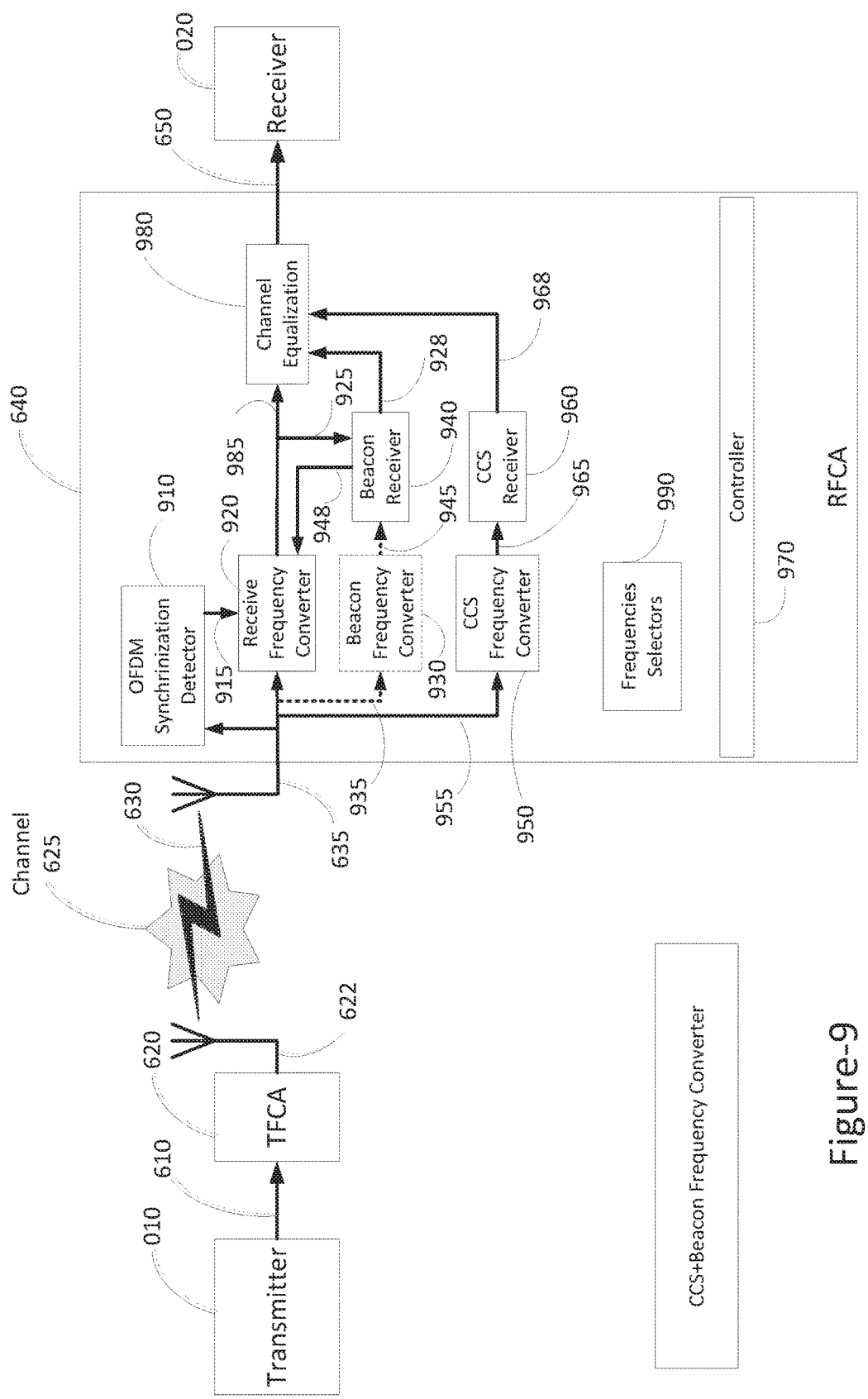
Figure 12:
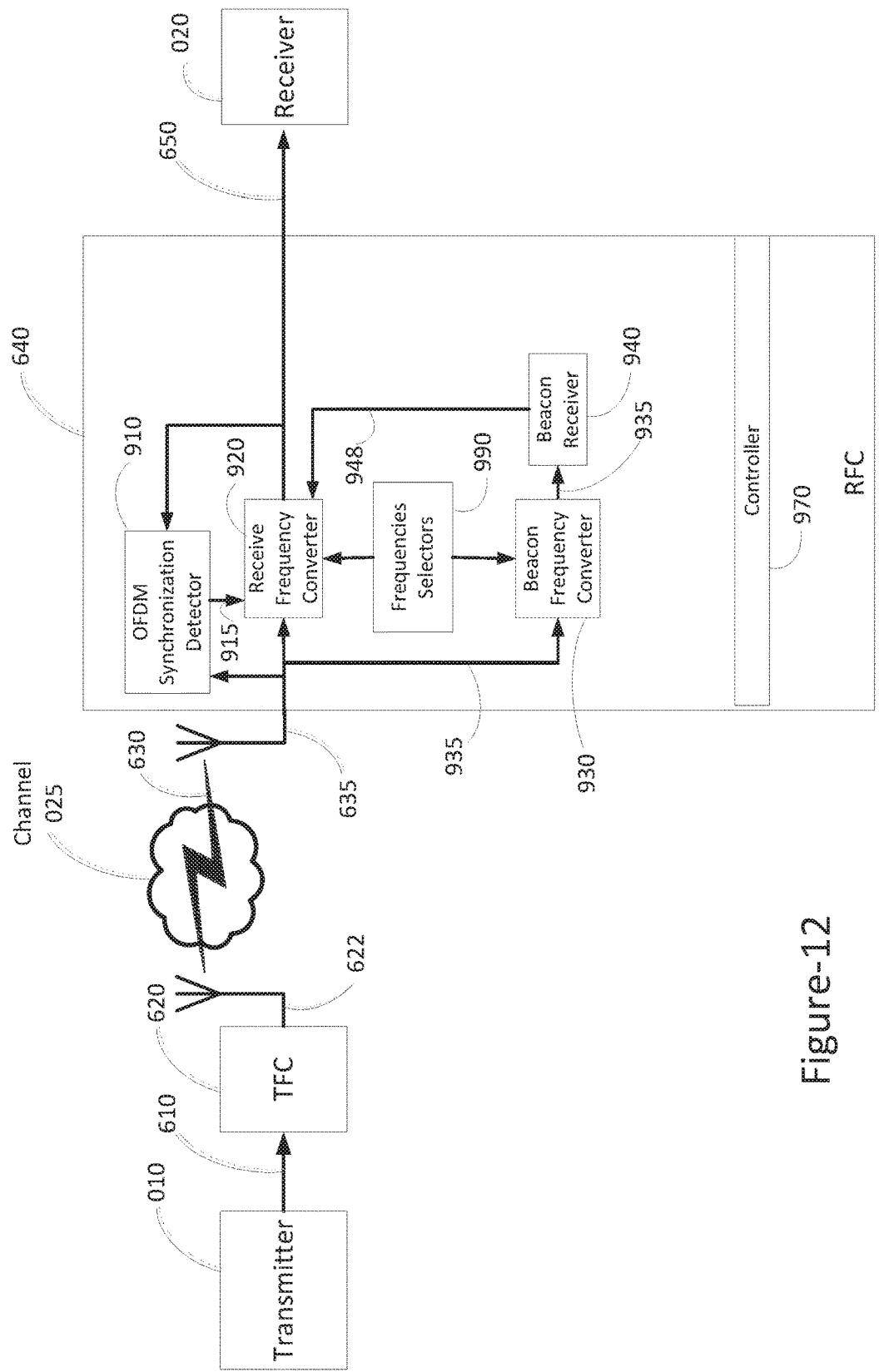
FIG. 12 depicts a block diagram of an example implementation of the Receive Frequency Converter (RFC) portion of the add-on frequency diversity apparatus comprising a beacon receiver, according to an embodiment of the present invention.

FIG. 12 depicts a more detailed block diagram of an example of the Receive Frequency Converter (RFC) portion of the add-on frequency diversity apparatus comprising a beacon receiver, according to a further embodiment of the present invention. In this embodiment, Receive Frequency Converter (RFC) 640 comprises a synchronization detector 910, a receive frequency converter 920, and optionally a frequency selector 990. In the case of an OFDM communication protocol, synchronization detector 910 is an OFDM synchronization detector, as depicted in FIG. 9a, operative to detect predetermined portions of the OFDM signal. Alternatively, in the case of a CDMA communication protocol, synchronization detector 910 is a CDMA synchronization detector, operative to detect predetermined portions of the CDMA signal. Alternatively, according to the communication protocol, synchronization detector 910 is operative to detect predetermined portions of the relevant communication protocol signal.

Typically, synchronization detector 910 is operative to detect predetermined portions of the relevant communication protocol signal in which the frequency conversion/shift may be realized, as described above regarding FIGS. 2-7. Typically, upon detection of said predetermined portion, the synchronization detector 910 synchronizes the receive frequency converter 920 to perform a change in the alternative center frequency, e.g. to perform a change in the active frequency shift. Receive frequency converter 920 is the actual component that performs the frequency conversion. The new alternative center frequency may optionally be determined by a frequency selector 990. Further optionally, a controller 970 resides in Receive Frequency Converter (RFC) 640, for controlling the operation of its process. Optionally, the change in the alternative center frequency is made upon several consecutive detections of said predetermined portion. Further optionally, the change in the alternative center frequency is determined by some predefined criteria taking into account the detection of said predetermined portion.

Optionally, synchronization detector 910 may use the received signal 635 (e.g. the signal which is received at the alternative center frequency) for the purpose of detection and synchronization. Optionally, synchronization detector 910 may use the signal 650 (e.g. the signal which has the original center frequency) for the purpose of detection and synchronization. Further optionally, synchronization detector 910 may use both signals, 635 and 650.

Optionally, said predetermined portions of the signal, in which the frequency conversion/shift may be realized, are "non-critical regions" of the transmission, in that improper reception of these portions/regions is not as harmful to the receiver as other (critical) regions. Some examples of such portions/regions are described above regarding FIGS. 2-5, and also herein below.

Some examples of the operation of the synchronization detector 840 are:

a. In the case of a OFDM or OFDMA communication protocol, the synchronization detector 910 may be operative to detect the Cyclic Prefix (CP) of the OFDM/OFDMA symbols, and to synchronize the receive frequency converter 920 to perform a change in the alternative center frequency during the reception of the CP.

b. In the case of a frame-based communication protocol, where a GAP or some guard period is placed between successive frames, the synchronization detector 910 may be operative to detect said GAP or guard period, and to synchronize the receive frequency converter 920 to perform a change in the alternative center frequency during said GAP or guard period.

c. In the case of a TDD communication protocol, where a GAP or some guard period is placed between the uplink subframe and the downlink subframe (or vice versa), the synchronization detector 910 may be operative to detect said GAP or guard period, and to synchronize the receive frequency converter 920 to perform a change in the alternative center frequency during said GAP or guard period.

d. In the case of a frame-based communication protocol, where an empty region (e.g. empty symbol as described above) is placed within the frames, the synchronization detector 910 may be operative to detect said empty region, and to synchronize the receive frequency converter 920 to perform a change in the alternative center frequency during said empty region.

e. In the case of a frame-based communication protocol, where a preamble or other known signal is placed within the frame, the synchronization detector 910 may be operative to detect the preamble or other known signal, and to synchronize the receive frequency converter 920 to perform a change in the alternative center frequency during non-critical regions (e.g. un-important symbol duration as described above).

Figure 10A:
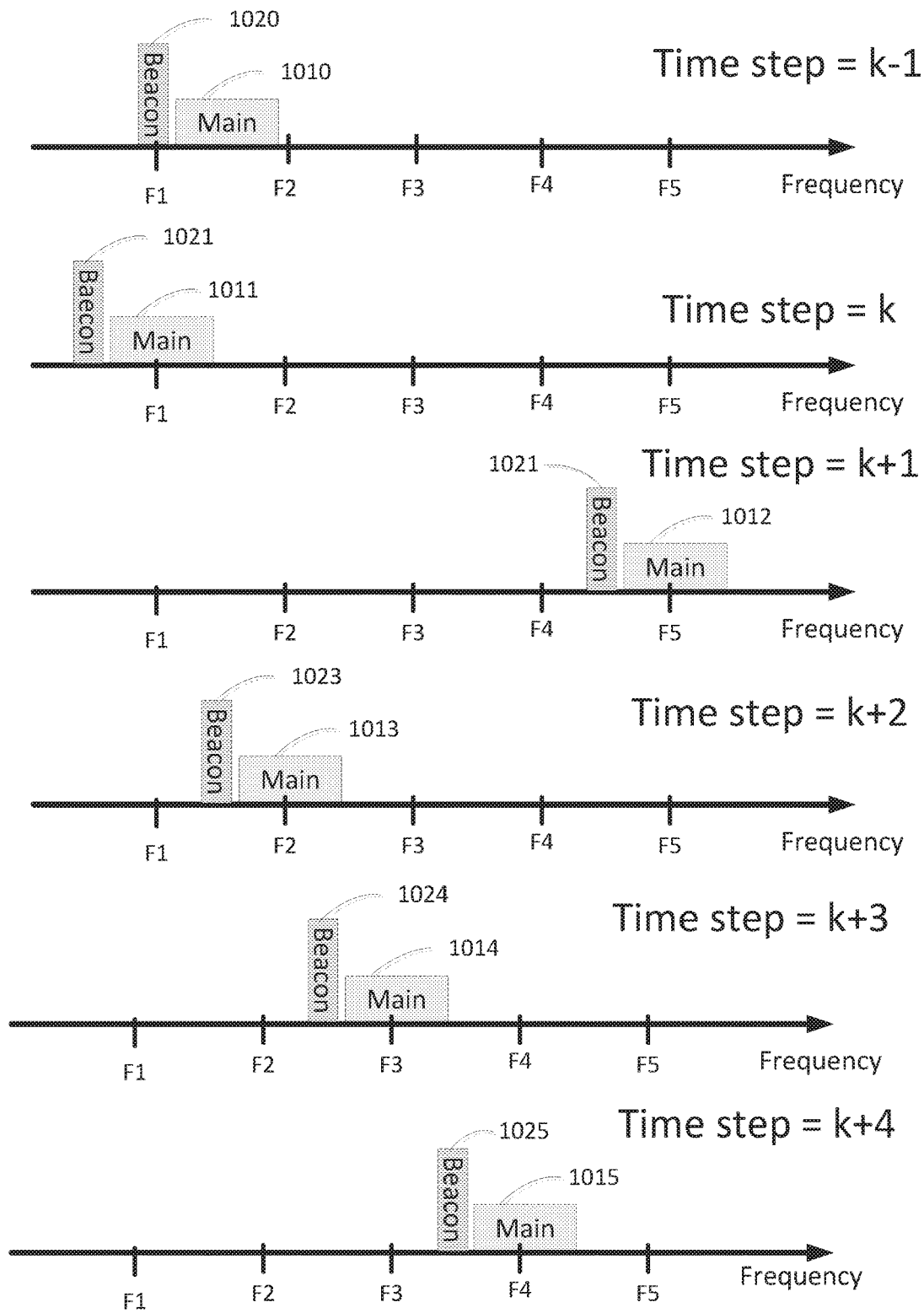
FIG. 10a is an illustration of the spectrum usage and allocation, as being changed along the time progress, with a beacon signal allocated according to a first embodiment of the present invention.

FIG. 10a is an illustration of the spectrum usage and allocation, as being changed along the time progress, with a beacon signal allocated according to a first embodiment of the present invention.

Figure 10B:
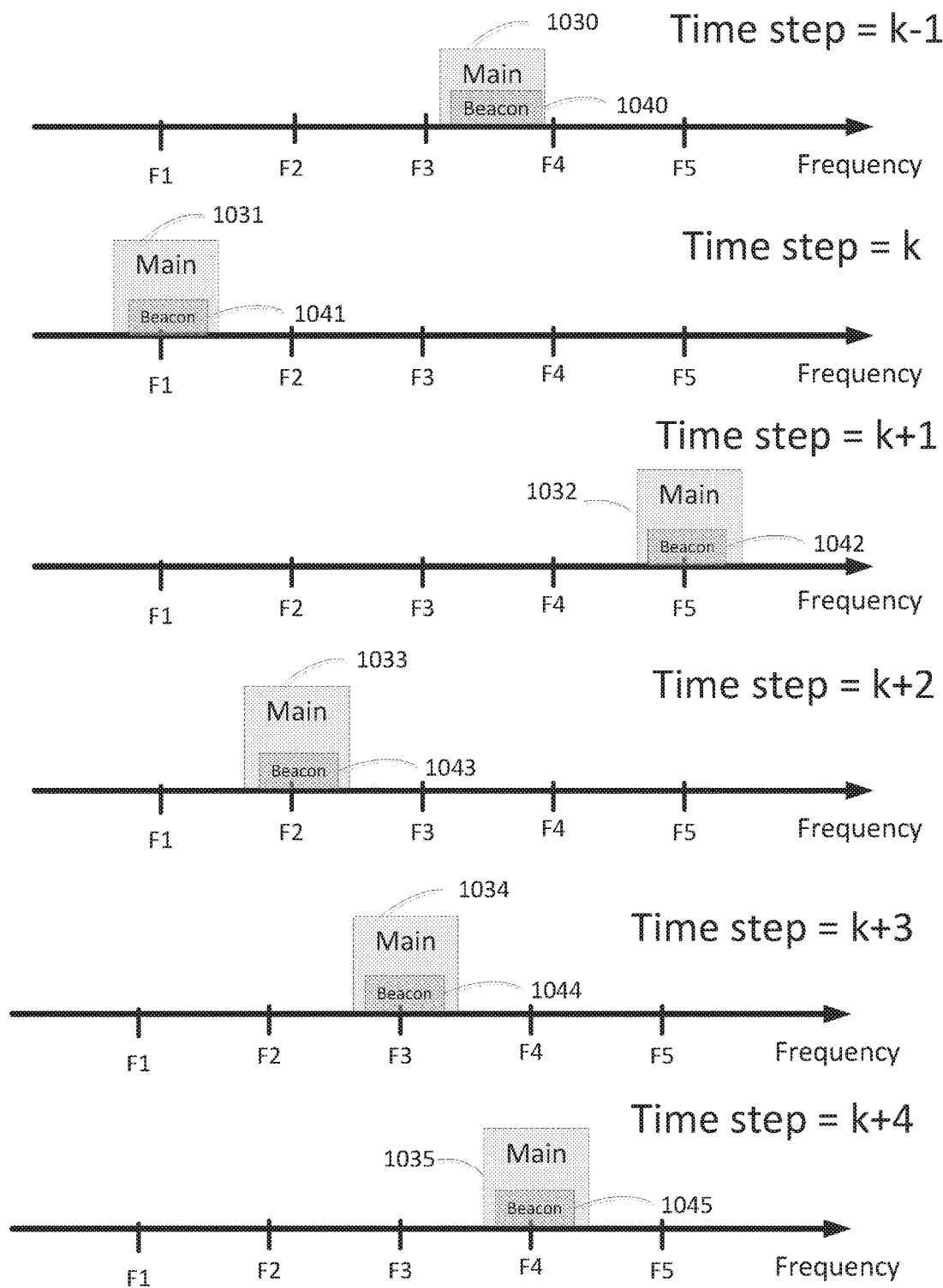
FIG. 10b is an illustration of the spectrum usage and allocation, as being changed along the time progress, with a beacon signal allocated according to a second embodiment of the present invention.

FIG. 10b is an illustration of the spectrum usage and allocation, as being changed along the time progress, with a beacon signal allocated according to a second embodiment of the present invention.

Figure 13A:
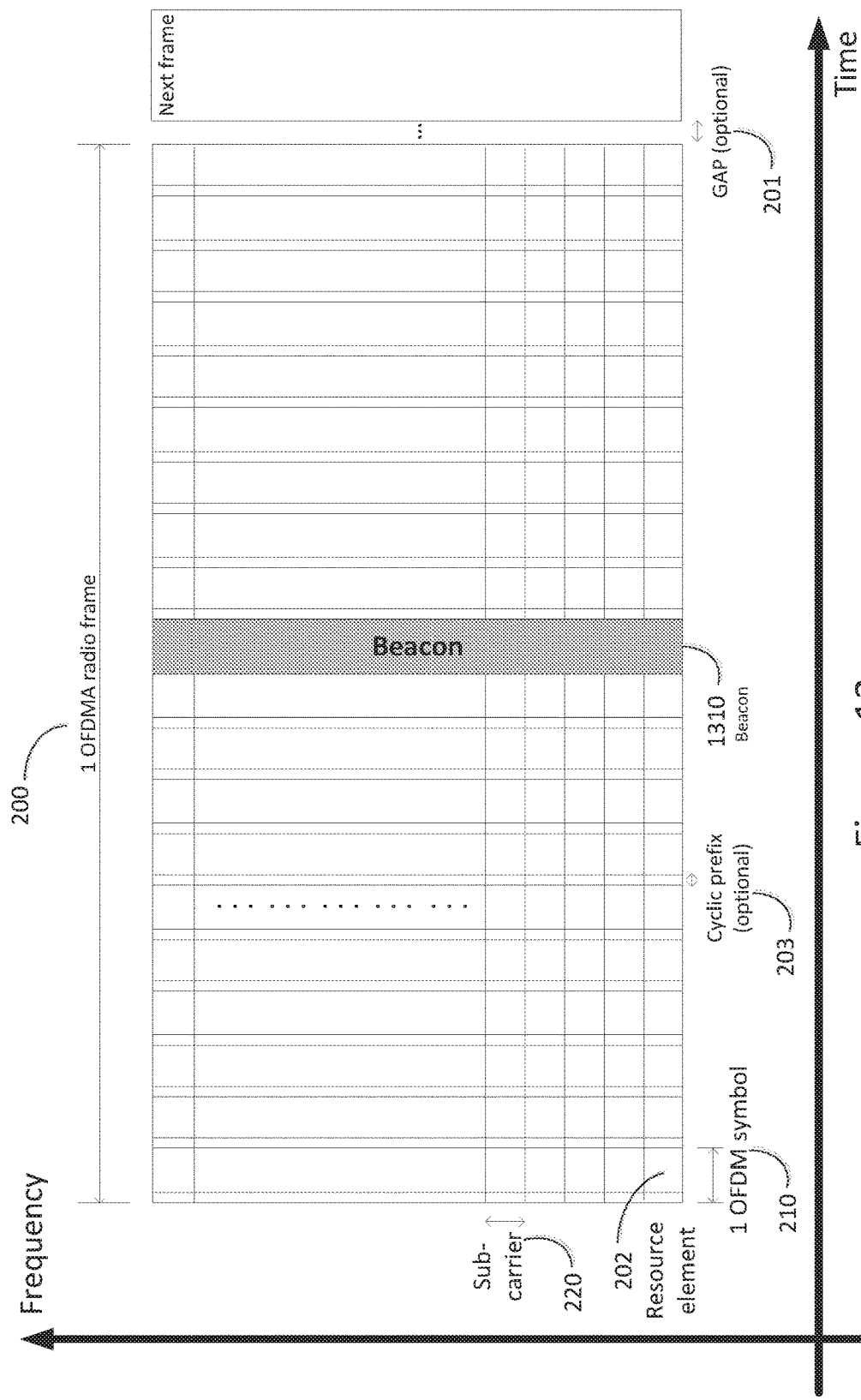
FIG. 13a is an illustration of a beacon signal allocation according to a third embodiment of the present invention.

FIG. 13a is an illustration of a beacon signal allocation according to a third embodiment of the present invention.

Figure 13B:
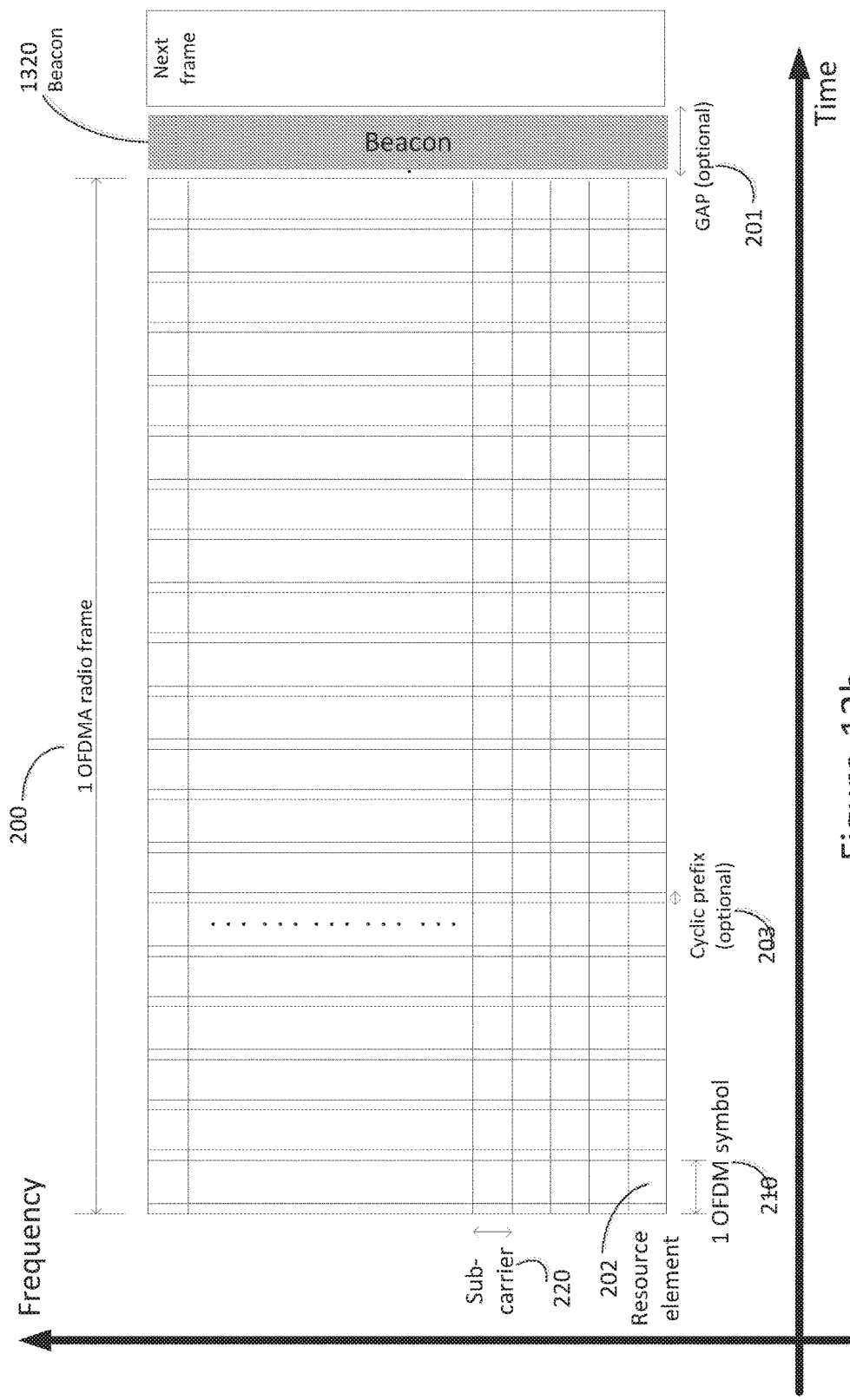
FIG. 13b is an illustration of a beacon signal allocation according to a fourth embodiment of the present invention.

FIG. 13b is an illustration of a beacon signal allocation according to a fourth embodiment of the present invention.

FIG. 13c is an illustration of a beacon signal allocation according to a fifth embodiment of the present invention.

FIG. 10a is an illustration of example of the spectrum usage and allocation, as being changed along the time progress, with a beacon signal allocated according to an embodiment of the present invention. In this example the Beacon covers different frequency allocations than the main signal. This example shows a constant offset of the center frequency of the Beacon with respect to the center frequency of the main signal. It can be seen that the Beacon and the main signal have the same frequency shifts over time. Optionally, this behavior can be cyclic (if there is a fixed list of frequency shifts of the main signal, and it is executed in a cyclic order, meaning implementing the frequency shift in a sequential order and that after executing the last frequency shift in the list, the next frequency shift is again the first frequency shift in the list). Optionally, the behavior can be non-cyclic (no cyclic order of frequency shifts) and may be determined according a predetermined algorithm. Optionally the frequency shifts enable orthogonal coverage of bandwidths of the main or Beacon signals, meaning e.g. that there is no overlap of frequencies (bandwidth wise) between all the bandwidths of the main signal and/or the Beacon along the different frequency shifts (as can be seen at time steps "k" to time step "k+4"). Optionally the frequency shifts enable non-orthogonal coverage of bandwidths of the main or Beacon signals (as can be seen at time steps "k−1" with respect to time steps "k" and to time step "k+2" because e.g. main signal 1010 at time step "k−1" covers the same frequencies as main signal 1011 of time step "k" and main signal 1013 of time step "k+2". Further optionally, the frequency shifts enable a combination of the two frequency shift schemes over time (orthogonal and non-orthogonal). There may be non-constant frequency offset between the Beacon signal and the main signal, in other embodiments of present invention.

FIG. 10b is an illustration of n example of the spectrum usage and allocation, as it changes over time, with a beacon signal allocated according to an embodiment of the present invention. In this example the Beacon covers part of the frequency allocation of the main signal. This example shows the same center frequency or a constant offset of the center frequency of the Beacon with respect to the center frequency of the main signal. It can be seen that the Beacon and the main signal have the same frequency shifts over time (optionally they may have different frequency shifts). Optionally this behavior can be cyclic (if there is a fixed list of frequency shifts of the main signal, and it is executed in a cyclic order, meaning implementing the frequency shift in a sequential order, and that after executing the last frequency shift in the list, the next frequency shift is again the first frequency shift in the list). Optionally, the behavior can be non-cyclic (no cyclic order of frequency shifts) and may be determined according a predetermined algorithm. Optionally, the frequency shifts enable orthogonal coverage of bandwidths of the main or Beacon signals, meaning e.g. that there is no overlap of frequencies (bandwidth wise) between all the bandwidths of the main signal and/or the Beacon along the different frequency shifts (as can be seen at time steps "k" to time step "k+4"). Optionally the frequency shifts enable non-orthogonal coverage of bandwidths of the main or Beacon signals (as can be seen at time steps "k−1" with respect to time steps "k+3" and to time step "k+4" because e.g. main signal 1030 at time step "k−1" covers the same frequencies as main signal 1034 of time step "k+3" and main signal 1035 of time step "k+4". Further optionally the frequency shifts enable a combination of the two frequency shift schemes over time (orthogonal and non-orthogonal). There may be non-constant frequency offset between the Beacon signal and the main signal, in other embodiments of present invention. The CCS can optionally be transmitted during the same time periods that the main signal is transmitted, or further optionally, during only a part of the time periods of the main signal (as will be illustrated in FIGS. 13a, 13b and 13c hereunder).

FIG. 13a is an illustration of an example of a beacon signal allocation according to an embodiment of the present invention. In this example, a Beacon signal 1310 being transmitted at only a portion of the frame duration (time) of an OFDMA frame 200 is proposed (e.g. at a non-critical region such as un-important symbol duration). The Beacon signal, in this example, covers all the bandwidth of the frame/communication protocol. The same may be applied to any frame based communication protocol.

FIG. 13b is an illustration of a beacon signal allocation according to an embodiment of the present invention. In this example, a Beacon signal 1320 being transmitted at only a portion of the frame duration (time) of an OFDMA frame 200 is proposed, e.g. at the time GAP between frames. The Beacon signal, in this example, covers all the bandwidth of the frame/communication protocol. The same may be applied to any frame based communication protocol.

FIG. 13c is an illustration of a beacon signal allocation according to an embodiment of the present invention. In this example, a Beacon signal 1330 being transmitted at only a portion of the frame duration (time) of an OFDMA frame 200 is proposed (e.g. at a non-critical region such as un-important resource elements). The Beacon signal, in this example, covers part of the bandwidth of the frame/communication protocol. The same may be applied to any frame based communication protocol.

Also included in the present invention are the following embodiments:

Embodiment 47

A wireless communication system comprising:
at least one wireless communication network node having a capacity for communicating with at least one additional wireless communication network node at a given center frequency and according to a given wireless communication protocol; and at least one external frequency converter, external to said node, said converter shifting the received signal of said at least one wireless network node from a first alternative center frequency to said given center frequency, wherein said first alternative center frequency is changed from time to time during communication between said at least one wireless communication network node and said at least one additional wireless communication network node; and wherein said external frequency converter is operative to receive a beacon signal at a second alternative center frequency.

Embodiment 50

A system according to Embodiment 47 wherein said external frequency converter comprises a beacon receiver operative to receive said beacon signal.

Embodiment 65

A system according to Embodiment 47 wherein said beacon signal is received out of the frequency band of the transmission of said communication protocol.

Embodiment 66

A system according to Embodiment 47 wherein said beacon signal is received within the frequency band of the transmission of said communication protocol.

Embodiment 67

A system according to Embodiment 47 wherein said beacon signal is received continuously whenever said communication protocol is received.

Embodiment 68

A system according to Embodiment 47 wherein said beacon signal is received only during partial intervals of the transmission of said communication protocol.

Embodiment 69

A system according to Embodiment 47 wherein said beacon signal spans over the whole frequency bandwidth as the transmission of said communication protocol.

Embodiment 70

A system according to Embodiment 47 wherein said beacon signal spans over only partial frequency bandwidth as the transmission of said communication protocol.

Embodiment 71

A system according to Embodiment 47 wherein said beacon signal is a CW signal.

Embodiment 72

A system according to Embodiment 47 wherein said beacon signal is a predetermined signal.

Embodiment 73

A system according to Embodiment 47 wherein said beacon signal is a single frequency tone.

Embodiment 74

A system according to Embodiment 47 wherein said beacon signal comprises multiple frequency tones.

Embodiment 75

A system according to Embodiment 47 wherein said beacon signal is received periodically.

Embodiment 76

A system according to Embodiment 47 wherein said beacon signal is carrying information.

Embodiment 77

A system according to Embodiment 47 wherein said beacon signal is a modulated signal carrying information.

Embodiment 78

A system according to Embodiment 47 wherein said second alternative center frequency is changed from time to time during communication between said at least one wireless communication network node and said at least one additional wireless communication network node.

Embodiment 79

A system according to Embodiment 76 wherein said information comprises said first alternative center frequency.

Embodiment 80

A system according to Embodiment 76 wherein said information comprises the first alternative center frequency for the next change. Typically, the beacon carries information of the frequency to be used when the upcoming frequency change occurs.

Embodiment 81

A system according to Embodiment 76 wherein said information comprises the second alternative center frequency for the next change.

Embodiment 82

A system according to Embodiment 78 wherein said first and second alternative center frequencies is changed periodically every predetermined time interval.

Embodiment 83

A system according to Embodiment 78 wherein said first and second alternative center frequencies are taken from a predetermined list of frequencies.

Embodiment 84

A system according to Embodiment 78 wherein said first and second alternative center frequencies are computed by the external frequency converter.

Embodiment 85

A system according to Embodiment 78 wherein said first and second alternative center frequencies are configured by means external to said external frequency converter.

Embodiment 86

A system according to Embodiment 78 wherein said external frequency converter comprises a synchronization detector, operative to detect predetermined portion of the signal of said communication protocol, and to synchronize said change in said first and second alternative center frequencies during said detected portion of the signal.

Embodiment 87

A system according to Embodiment 47 wherein said communication protocol comprises an LTE cellular communication protocol.

Embodiment 88

A system according to Embodiment 47 wherein said communication protocol comprises a 3G cellular communication protocol.

Embodiment 89

A system according to Embodiment 47 wherein said communication protocol comprises a WiMAX cellular communication protocol.

Embodiment 90

A system according to Embodiment 47 wherein said communication protocol comprises an OFDM communication protocol.

Embodiment 91

A system according to Embodiment 47 wherein said communication protocol comprises an OFDMA communication protocol.

Embodiment 92

A system according to Embodiment 86 and also to Embodiment 90, wherein said predetermined portion is a Cyclic Prefix of an OFDM symbol.

Embodiment 93

A system according to Embodiment 86 and also to Embodiment 91, wherein said predetermined portion is a Cyclic Prefix of an OFDMA symbol.

Embodiment 94

A system according to Embodiment 86, wherein said predetermined portion is a GAP between successive frames of said communication protocol.

Embodiment 95

A system according to Embodiment 86, wherein said communication protocol is a TDD protocol, and wherein said predetermined portion is a GAP between the uplink subframe and the downlink subframe of said communication protocol.

Embodiment 96

A system according to Embodiment 50 wherein said beacon receiver uses said beacon signal to synchronize the external frequency converter to said first alternative center frequency.

Embodiment 97

A system according to Embodiment 50 wherein said beacon receiver uses said beacon signal to configure the external frequency converter to said first alternative center frequency.

Embodiment 98

A system according to Embodiment 50 wherein said beacon receiver uses said beacon signal for timing synchronization of the external frequency converter with regard to said communication protocol.

Embodiment 99

A system according to Embodiment 50 and also to Embodiment 76, wherein said beacon receiver extracts said information from said beacon signal.

Embodiment 100

A system according to Embodiment 99 wherein said extracted information is used to configure the external frequency converter to said first alternative center frequency.

Embodiment 101

A system according to Embodiment 50 and also to Embodiment 79, wherein said beacon receiver extracts said information from said beacon signal, and wherein said extracted information is used to configure the external frequency converter to said first alternative center frequency.

Embodiment 102

A system according to Embodiment 50 and also to Embodiment 80, wherein said beacon receiver extracts said information from said beacon signal, and wherein said extracted information is used to configure the external frequency converter to said first alternative center frequency for the upcoming (e.g. next) change.

Embodiment 103

A system according to Embodiment 50 and also to Embodiment 81, wherein said beacon receiver extracts said information from said beacon signal, and wherein said extracted information is used to configure the external frequency converter to said second alternative center frequency for the upcoming (e.g. next) change.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution may include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A receiver-end apparatus for a communication system, comprising:

a receiver add-on device operative to identify, within a received main signal, an auxiliary signal having predefined characteristics known by the receiver add-on device and a transmitter add-on device, and including a frequency diversity provider operative to use the auxiliary signal to identify, within the received main signal, a trigger commanding the frequency diversity provider to shift a center frequency of the received main signal; and a receive frequency converter subsystem added upstream of a receiver apparatus which uses a fixed center frequency, and wherein the receive frequency converter subsystem comprises:

a synchronization detector, operative to detect predetermined portions of a relevant communication protocol signal according to a communication protocol, and a receive frequency converter module which performs a frequency conversion operation to reconvert back to an original center frequency including using a beacon signal for estimation and synchronization of at least one of time and frequency, wherein the receive frequency converter subsystem is operative in conjunction with a remote transmitter add-on device including a transmit frequency converter subsystem operative, when deployed downstream of a transmitter apparatus which uses the fixed center frequency, to communicate with the receiver add-on device to transmit the auxiliary signal to the receive frequency converter subsystem, wherein the transmit frequency converter subsystem comprises a second synchronization detector, operative to detect the portions of the relevant communication protocol signal in which frequency conversion/shift can be implemented, according to the communication protocol, and a transmit frequency converter that performs frequency conversion of an original center frequency, wherein upon detection of the portions, the second synchronization detector synchronizes the transmit frequency converter to perform a change of an alternative center frequency, wherein the auxiliary signal having predefined characteristics known by the receiver add-on device and the transmitter add-on device is used by the receive frequency converter module to coordinate the frequency conversion operation with the transmit frequency converter, and wherein the auxiliary signal having predefined characteristics comprises a continuous wave signal.

2. The receiver-end apparatus of claim 1, wherein a receiving antenna is provided which covers all the shifted frequencies implemented by the transmit frequency converter subsystem and is interfaced to the receive frequency converter module.

3. The receiver-end apparatus of claim 1, wherein the receive frequency converter module re-converts the shifted center frequency to the original center frequency.

4. A communication method, comprising:
providing a receiver-end apparatus for a communication system, comprising:
providing a receiver add-on device operative to identify, within a received main signal, an auxiliary signal having predefined characteristics known by the receiver add-on device and a transmitter add-on device, and including a frequency diversity provider operative to use the auxiliary signal to identify, within the received main signal, a trigger commanding the frequency diversity provider to shift a center frequency of the received main signal,
the receiver add-on device comprising a receive frequency converter subsystem, added upstream of a receiver apparatus which uses a fixed center frequency, and wherein the receive frequency converter subsystem comprises:
a synchronization detector, operative to detect predetermined portions of a relevant communication protocol signal according to a communication protocol, and
a receive frequency converter module which performs a frequency conversion operation to reconvert back to an original center frequency including using a beacon signal for estimation and synchronization of at least one of time and frequency,
wherein the receive frequency converter subsystem is operative in conjunction with a remote transmitter add-on device including a transmit frequency converter subsystem operative, when deployed downstream of a transmitter apparatus which uses the fixed center frequency, to communicate with the receiver add-on device to transmit the auxiliary signal to the receive frequency converter subsystem, wherein the transmit frequency converter subsystem comprises a second synchronization detector, operative to detect the portions of the relevant communication protocol signal in which frequency conversion/shift can be implemented, according to the communication protocol, and a transmit frequency converter module that performs frequency conversion of an original center frequency, wherein upon detection of the portions, the second synchronization detector synchronizes the transmit frequency converter module to perform a change of an alternative center frequency,
wherein the auxiliary signal having predefined characteristics known by the receiver and a transmitter is used by the receive frequency converter module to coordinate the frequency conversion operation with the transmit frequency converter module, and
wherein the auxiliary signal having predefined characteristics comprises a continuous wave signal.

5. A transmitter-end apparatus for a communication system operative in conjunction with at least one communication network node having a capacity for communicating with at least one additional communication network node at a given fixed center frequency and according to a communication protocol, the transmitter-end apparatus comprising:
a transmitter add-on device including at least one external transmit frequency converter subsystem, external to and deployed downstream of the at least one communication network node, the converter shifting the transmitted signal of the at least one communication network network node from the given center frequency to a first alternative center frequency, wherein the first alternative center frequency being changed from time to time during the communication between the at least one communication network node and the at least one additional communication network node, and wherein the external frequency converter is operative to transmit a beacon signal at a second alternative center frequency, in addition to the transmission of the communication protocol at the first alternative center frequency,
wherein the transmit frequency converter subsystem is operative to transmit the beacon signal to a remote receive frequency converter subsystem, and wherein the transmit frequency converter subsystem comprises a synchronization detector, operative to detect portions of a relevant communication protocol signal in which frequency conversion/shift can be implemented, according to the communication protocol, and a transmit frequency converter module that performs frequency conversion of an original center frequency, wherein upon detection of the portions, the synchronization detector synchronizes the transmit frequency converter subsystem to perform a change of an alternative center frequency, so as to allow the receive frequency converter subsystem, when added upstream of a receiver apparatus which uses a fixed center frequency, to perform a frequency conversion operation to reconvert back to an original center frequency including using the beacon signal for estimation and synchronization of at least one of time and frequency.

6. The transmitter-end apparatus of claim 5, wherein the beacon signal is transmitted only during partial intervals of the transmission of the communication protocol.

7. The transmitter-end apparatus of claim 5, wherein the beacon signal spans over only partial frequency bandwidth as the transmission of the communication protocol.

8. The transmitter-end apparatus of claim 5, wherein the beacon signal is a modulated signal carrying information.

9. The transmitter-end apparatus of claim 5, wherein the second alternative center frequency is changed from time to time during the communication between the at least one communication network node and the at least one additional communication network node.

10. The transmitter-end apparatus of claim 9, wherein the first and second alternative center frequencies are taken from a predetermined list of frequencies.

11. The transmitter-end apparatus of claim 5, wherein the beacon signal carries information comprising the first alternative center frequency.

12. The transmitter-end apparatus of claim 5, wherein the transmit frequency converter subsystem is connected to a transmitting antenna that covers all shifted frequencies implemented by the transmit frequency converter module.

13. The transmitter-end apparatus of claim 12, wherein a power amplifier is added between the transmit frequency converter subsystem and the transmitting antenna.

14. The communication method of claim 4, wherein the beacon signal is transmitted only during partial intervals of the transmission of the communication protocol.

15. The communication method of claim 4, wherein the beacon signal spans over only partial frequency bandwidth as the transmission of the communication protocol.

16. The communication method of claim 4, wherein the beacon signal comprises a modulated signal carrying information.

17. The communication method of claim 4, wherein the beacon signal is transmitted at a second alternative center frequency which is changed from time to time during the communication between the at least one communication network node and the at least one additional communication network node.

18. The communication method of claim 17, wherein the second alternative center frequency is taken from a predetermined list of frequencies.

19. The communication method of claim 4, wherein the transmit frequency converter subsystem is connected to a transmitting antenna that covers all shifted frequencies implemented by the transmit frequency converter module.

* * * * *